(12) United States Patent
Su

(10) Patent No.: US 12,100,253 B2
(45) Date of Patent: Sep. 24, 2024

(54) METHOD FOR SMART LOCK UNLOCKING, RELATED APPARATUS, AND STORAGE MEDIUM

(71) Applicant: Shenzhen Kaadas Intelligent Technology Co., Ltd., Guangdong (CN)

(72) Inventor: Qiyun Su, Guangdong (CN)

(73) Assignee: SHENZHEN KAADAS INTELLIGENT TECHNOLOGY CO., LTD.

( * ) Notice: Subject to any disclaimer, the term of this patent is extended or adjusted under 35 U.S.C. 154(b) by 52 days.

(21) Appl. No.: 17/989,783

(22) Filed: Nov. 18, 2022

(65) Prior Publication Data
US 2023/0290205 A1 Sep. 14, 2023

(30) Foreign Application Priority Data
Mar. 11, 2022 (CN) .......................... 202210243361.3

(51) Int. Cl.
*G07C 9/22* (2020.01)
*G07C 9/00* (2020.01)
(Continued)

(52) U.S. Cl.
CPC ........... *G07C 9/22* (2020.01); *G07C 9/00309* (2013.01); *G07C 9/00571* (2013.01); *G07C 9/27* (2020.01);
(Continued)

(58) Field of Classification Search
None
See application file for complete search history.

(56) References Cited

U.S. PATENT DOCUMENTS 11,176,765 B2 * 11/2021 Mlynarczyk ..... G06K 19/07798
11,348,392 B2 * 5/2022 Jakubek .................. H04L 63/10
(Continued)

FOREIGN PATENT DOCUMENTS

CN 107393071 A 11/2017
CN 107564158 A 1/2018
(Continued)

OTHER PUBLICATIONS

Notification to Grant Patent Right for Invention dated Feb. 26, 2024 received in Chinese Patent Application No. CN 202210243361.3.
(Continued)

*Primary Examiner* — Fekadeselassie Girma
(74) *Attorney, Agent, or Firm* — Scully, Scott, Murphy & Presser, P.C.

(57) ABSTRACT

A method for smart lock unlocking and related apparatuses are provided. The method includes the following. A server receives a first request message transmitted by a first terminal. The server determines an identity (ID) of the first terminal according to the first request message. The server determines a first smart lock bound to the first terminal according to the ID of the first terminal, where a correspondence between multiple terminals and multiple smart locks is stored in the server. The server transmits a first verification parameter to the first terminal and the first smart lock, where the first verification parameter is used for the first terminal to verify an ID of the first smart lock and for the first smart lock to verify the ID of the first terminal when unlocking.

16 Claims, 8 Drawing Sheets

(51) Int. Cl.
  *G07C 9/27* (2020.01)
  *H04W 4/02* (2018.01)
  *H04W 4/021* (2018.01)
(52) U.S. Cl.
  CPC ........... *H04W 4/021* (2013.01); *H04W 4/023* (2013.01); *G07C 2009/00769* (2013.01); *G07C 2209/63* (2013.01)

(56) References Cited

U.S. PATENT DOCUMENTS

| | | | |
|---|---|---|---|
| 2010/0217972 A1 | 8/2010 | Lohiniva et al. | |
| 2014/0002236 A1* | 1/2014 | Pineau | G07C 9/00309 340/5.6 |
| 2014/0120905 A1* | 5/2014 | Kim | H04W 4/80 455/426.1 |
| 2014/0340195 A1* | 11/2014 | Polak | H03F 3/45071 340/5.61 |
| 2015/0119000 A1 | 4/2015 | Miao et al. | |
| 2015/0379438 A1* | 12/2015 | Krause | G07C 9/27 705/5 |
| 2016/0036594 A1* | 2/2016 | Conrad | G06F 21/35 713/185 |
| 2016/0116510 A1* | 4/2016 | Kalous | G07C 9/00571 340/636.1 |
| 2016/0277439 A1* | 9/2016 | Rotter | H04L 63/0861 |
| 2017/0154483 A1* | 6/2017 | Cordiner | H04W 4/30 |
| 2017/0270723 A1 | 9/2017 | He et al. | |
| 2019/0205847 A1* | 7/2019 | Cho | G07C 9/00896 |
| 2020/0202652 A1* | 6/2020 | Kuenzi | G07C 9/00309 |
| 2020/0242863 A1* | 7/2020 | Chang | H04W 4/80 |
| 2020/0250909 A1 | 8/2020 | Li et al. | |
| 2021/0040772 A1* | 2/2021 | Kim | G06Q 30/02 |
| 2021/0043019 A1* | 2/2021 | Liao | G07C 9/26 |
| 2021/0233021 A1* | 7/2021 | Estill | G07C 9/00912 |

FOREIGN PATENT DOCUMENTS

| | | | | |
|---|---|---|---|---|
| CN | 107644478 A | | 1/2018 | |
| CN | 107680227 A | | 2/2018 | |
| CN | 109243017 A | | 1/2019 | |
| CN | 109544733 A | * | 3/2019 | ......... G07C 9/00309 |
| CN | 109658555 A | | 4/2019 | |
| CN | 106652117 B | | 7/2019 | |
| CN | 110782564 A | | 2/2020 | |
| CN | 112712612 A | | 4/2021 | |
| CN | 109544731 B | * | 1/2022 | ......... G07C 9/00571 |
| CN | 110099164 B | | 4/2022 | |
| KR | 102366869 B1 | * | 2/2022 | |

OTHER PUBLICATIONS

Notice of the First Review Opinion dated Nov. 16, 2023 received in Chinese Patent Application No. CN 202210243361.3.

Office Action dated May 8, 2024 received in Canadian Patent Application No. 3,182,057.

* cited by examiner

METHOD FOR SMART LOCK UNLOCKING, RELATED APPARATUS, AND STORAGE MEDIUM

CROSS-REFERENCE TO RELATED APPLICATIONS

This application claims priority under 35 U.S.C. § 119(a) to Chinese Patent Application No. 202210243361.3, filed Mar. 11, 2022, the entire disclosure of which is incorporated herein by reference.

TECHNICAL FIELD

This disclosure relates to the field of a smart lock technology, and more particularly to a method for smart lock unlocking, related apparatuses, and a storage medium.

BACKGROUND

With rapid development of scientific technologies, smart homes have gradually become popular, for example, mobile terminals, and particularly, smart phones. At present, smart phones have more and more functions, where the functions basically include a Bluetooth function, a wireless fidelity (Wi-Fi) function, a positioning function, etc. For another example, smart locks have also been widely applied to homes and businesses, and use of smart locks greatly facilitates lives of people.

Currently, smart locks are generally unlocked through biological identification information (e.g., a human face, a fingerprint, or a voice), a digital password, application (APP) instruction control, etc. However, no matter which of the biological identification information, the digital password, or the APP instruction is used, it requires users to walk to a smart lock to subjectively enter information, and then the smart lock performs information verification.

Therefore, how to reduce information entered by users during smart lock unlocking has become a technical problem being studied by those skilled in the art.

SUMMARY

Embodiments of the disclosure provide a method for smart lock unlocking. The method includes the following. A server receives a first request message transmitted by a first terminal. The server determines an identity (ID) of the first terminal according to the first request message. The server determines a first smart lock bound to the first terminal according to the ID of the first terminal and a correspondence between multiple terminals and multiple smart locks, where the correspondence is stored in the server. The server transmits a first verification parameter to the first terminal and the first smart lock, where the first verification parameter is used for the first terminal to verify an ID of the first smart lock and for the first smart lock to verify the ID of the first terminal when unlocking.

Embodiments of the disclosure provide a method for smart lock unlocking. The method includes the following. A first smart lock receives a first verification parameter transmitted by a server, where the first verification parameter is a verification parameter that is transmitted by the server to a first terminal and the first smart lock when the server receives a first request message transmitted by the first terminal. The first smart lock broadcasts the first verification parameter, where the first verification parameter broadcasted is used for the first terminal to verify an ID of the first smart lock. The first smart lock receives an unlock command transmitted by the server, where the unlock command is transmitted by the first terminal to the server when verification of the ID of the first smart lock passes. The first smart lock responds to the unlock command to unlock upon detection of a knocking operation at a door.

Embodiments of the disclosure provide a method for smart lock unlocking. The method includes the following. A first terminal transmits a first request message to a server, where the first request message is used to request the server to transmit a first verification parameter to the first terminal and a first smart lock bound to the first terminal. The first terminal receives the first verification parameter transmitted by the server. The first terminal receives a verification parameter transmitted by the first smart lock. The first terminal transmits an unlock command to the server when the verification parameter is the same as the first verification parameter, where the unlock command is used for the server to control unlocking of the first smart lock.

Embodiments of the disclosure provide an unlock device. The unlock device includes a processor and a memory. The memory is coupled with the processor and stores program instructions which are operable with the processor to execute the above method of embodiments of the disclosure.

Embodiments of the disclosure provide a non-transitory computer-readable storage medium. The non-transitory computer-readable storage medium stores computer programs which, when executed by a processor, are operable with the processor to execute the above method of embodiments of the disclosure.

BRIEF DESCRIPTION OF THE DRAWINGS

To illustrate technical solutions of embodiments of the disclosure more clearly, the following will give a brief introduction to accompanying drawings required for illustrating embodiments of the disclosure.

DETAILED DESCRIPTION

Figure 1A:
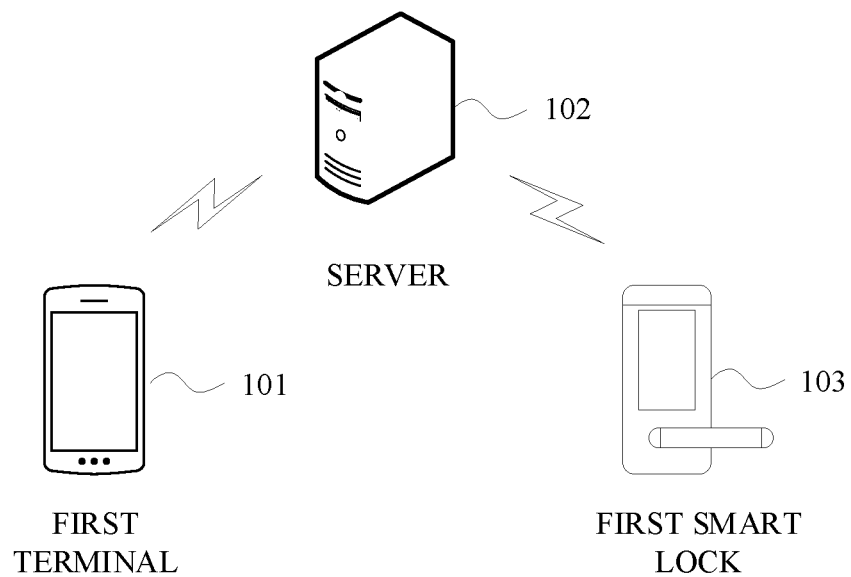
FIG. 1A is a schematic architectural diagram illustrating a system for smart lock unlocking provided in embodiments of the disclosure.

Embodiments of the disclosure provide a method for smart lock unlocking and related apparatuses, which can reduce information subjectively entered by users and improve efficiency and an accuracy rate of smart lock unlocking.

In a first aspect, embodiments of the disclosure provide a method for smart lock unlocking. The method includes the following. A server receives a first request message transmitted by a first terminal. The server determines an identity (ID) of the first terminal according to the first request message. The server determines a first smart lock bound to the first terminal according to the ID of the first terminal and a correspondence between multiple terminals and multiple smart locks, where the correspondence is stored in the server. The server transmits a first verification parameter to the first terminal and the first smart lock, where the first verification parameter is used for the first terminal to verify an ID of the first smart lock and for the first smart lock to verify the ID of the first terminal when unlocking.

In the above method, a correspondence between the first terminal and the first smart lock bound to the first terminal is stored in the server, and the ID of the first terminal and the ID of the first smart lock can be determined through internal processing. Moreover, in a whole process of implementing unlocking of the first smart lock, unlike identification manners of entering a digital password by a user or collecting a fingerprint, in the disclosure, smart lock unlocking can be implemented through a knocking operation at a door, which is equal to that information such as a digital password entered or a fingerprint can be processed among a server, a terminal, and a smart lock, thereby reducing information subjectively entered by a user and improving efficiency and an accuracy rate of smart lock unlocking.

In a possible implementation of the first aspect, after the server transmits the first verification parameter to the first terminal and the first smart lock, the method further includes the following. The server receives an unlock command transmitted by the first terminal, where the unlock command is transmitted when a verification parameter transmitted by the first smart lock to the first terminal is the first verification parameter. The server transmits the unlock command to the first smart lock.

In a possible implementation of the first aspect, after the server receives the unlock command transmitted by the first terminal, the method further includes the following. The server determines a time period from a time point when the server transmits the first verification parameter to a time point when the server receives the unlock command. The unlock command is transmitted to the first smart lock as follows. When the time period is less than a preset time period, the unlock command is transmitted to the first smart lock.

In a second aspect, embodiments of the disclosure provide a method for smart lock unlocking. The method includes the following. A first smart lock receives a first verification parameter transmitted by a server, where the first verification parameter is a verification parameter that is transmitted by the server to a first terminal and the first smart lock when the server receives a first request message transmitted by the first terminal. The first smart lock broadcasts the first verification parameter, where the first verification parameter broadcasted is used for the first terminal to verify an ID of the first smart lock. The first smart lock receives an unlock command transmitted by the server, where the unlock command is transmitted by the first terminal to the server when verification of the ID of the first smart lock passes. The first smart lock responds to the unlock command to unlock upon detection of a knocking operation at a door.

Some types of smart locks (e.g., digital password locks) may cost a long operation time when unlocking. In the disclosure, in a process of unlocking of the first smart lock, unlocking of the first smart lock can be implemented through a knocking operation at a door by a user, which reduces manual operations compared to unlocking through entering a digital password, and thus improving an accuracy rate of unlocking because of reduction of manual operations. Moreover, wear and tear of the smart lock is reduced because of reduction of manual operations, and thus service life of the smart lock is improved.

In a possible implementation of the second aspect, before the first smart lock responds to the unlock command to unlock upon detection of the knocking operation at the door, the method further includes the following. An angular motion detection apparatus of the first smart lock detects an angular acceleration of the angular motion detection apparatus. When the angular acceleration reaches a preset angular acceleration, the knocking operation at the door is determined to be detected.

In a third aspect, embodiments of the disclosure provide a method for smart lock unlocking. The method includes the following. A first terminal transmits a first request message to a server, where the first request message is used to request the server to transmit a first verification parameter to the first terminal and a first smart lock bound to the first terminal. The first terminal receives the first verification parameter transmitted by the server. The first terminal receives a verification parameter transmitted by the first smart lock. The first terminal transmits an unlock command to the server when the verification parameter is the same as the first verification parameter, where the unlock command is used for the server to control unlocking of the first smart lock.

In the above method, the verification parameter may be a random number. Therefore, an accuracy rate of verification can be improved because of randomness of the verification parameter, and randomness of the verification parameter plays an important role in guaranteeing security in a whole process of unlocking.

In a possible implementation of the third aspect, before the first terminal transmits the first request message to the server, the method further includes the following. The first terminal determines a geo-fence region according to a position of the first smart lock bound to the first terminal. The first terminal determines whether the first terminal is located in the geo-fence region. The first request message is transmitted to the server as follows. When the first terminal is located in the geo-fence region, the first request message is transmitted to the server.

After the geo-fence region is determined by a user at the first terminal, operations, e.g. how to determine whether the first terminal is located in the geo-fence region, and what should the first terminal perform when the first terminal is located in the geo-fence region, are processed by the first terminal, and it is unnecessary for the user to perform operations at the first terminal again, thus the method is easy to operate.

In a possible implementation of the third aspect, before the first terminal determines whether the first terminal is located in the geo-fence region, the method further includes the following. The first terminal determines a distance between the first terminal and the geo-fence through positioning, where the distance is used for an owner of the first terminal to determine within a range of the distance whether a user of the first terminal is the owner of the first terminal. The first terminal determines whether the user of the first terminal is the owner of the first terminal. Upon determining that the user of the first terminal is the owner of the first terminal, proceed to determining whether the first terminal is located in the geo-fence region.

It can be understood that, the first terminal determines whether the user of the first terminal is the owner of the first terminal, which can avoid security problems that come with the first terminal being used by others.

In a possible implementation of the third aspect, the geo-fence region is determined according to the position of the first smart lock bound to the first terminal as follows. The geo-fence region is determined by determining a geo-fence with the position of the first smart lock as a center and a preset radius. Alternatively, the geo-fence region is determined by outlining an actual geographical region where the first smart lock is located.

In a possible implementation of the third aspect, whether the first terminal is located in the geo-fence region is determined as follows. A position of the first terminal through positioning is determined. Draw on an application of the first terminal a line from the position of the first terminal to the position of the first smart lock through an algorithm. When the line drawn does not intersect with a geo-fence, determine that the first terminal is located in the geo-fence region, where the geo-fence region is enclosed by the geo-fence.

In a possible implementation of the third aspect, the method further includes the following. When the line drawn intersects with the geo-fence, determine that the first terminal is not located in the geo-fence region.

In a possible implementation of the third aspect, whether the first terminal is located in the geo-fence region is determined as follows. A change of a position of the first terminal is monitored periodically, to determine a distance between the first terminal and a geo-fence, where the geo-fence region is enclosed by the geo-fence. When the distance is less than a distance threshold, determine that the first terminal is located in the geo-fence region.

In a possible implementation of the third aspect, before receiving the verification parameter transmitted by the first smart lock, the method further includes the following. Start to monitor broadcast data once the first terminal receives a reply that the first smart lock successfully broadcasts, where the verification parameter transferred by the first smart lock is carried in broadcast data.

In a possible implementation of the third aspect, the method further includes the following. When the verification parameter is different from the first verification parameter, stop monitoring of broadcast data.

In a fourth aspect, embodiments of the disclosure provide a method for smart lock unlocking. The method for smart lock unlocking includes the following. A first terminal transmits a second request message to a first smart lock, where the second request message is used to request the first smart lock to transmit to the first terminal a first key matched with the first terminal. The first terminal receives the first key transmitted by the first smart lock. The first terminal transmits an unlock command to the first smart lock through the first key when the first key is the same as a local second key of the first terminal, where the unlock command is used for the first terminal to control unlocking of the first smart lock.

In the above method, in a process that the first terminal controls unlocking of the first smart lock through the first key, the key has high security, thereby greatly guaranteeing safe unlocking of the first smart lock controlled through the key.

In a possible implementation of the fourth aspect, before the first terminal transmits the second request message to the first smart lock, the method further includes the following. The first terminal determines a geo-fence region according to a position of the first smart lock bound to the first terminal. The first terminal determines whether the first terminal is located in the geo-fence region. The first terminal connects to the first smart lock when the first terminal is located in the geo-fence region.

In a fifth aspect, embodiments of the disclosure provide a method for smart lock unlocking. The method includes the following. A first smart lock receives a second request message transmitted by a first terminal. The first smart lock determines an ID of the first terminal according to the second request message. The first smart lock transmits to the first terminal a first key matched with the first terminal. The first smart lock receives an unlock command transmitted by the first terminal, where the unlock command is transmitted by the first terminal to the first smart lock when verification of a local second key of the first terminal and the first key passes. The first smart lock responds to the unlock command to unlock upon detection of a knocking operation at a door.

In a process of data interaction between the first terminal and the first smart lock, unlocking of the first smart lock can be implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock, thereby realizing unlocking of the first smart lock without the server.

In a sixth aspect, embodiments of the disclosure provide an unlock apparatus. The unlock apparatus includes a first receiving unit, a determining unit, and a first transmitting unit. The first receiving unit is configured to receive a first request message transmitted by a first terminal. The determining unit is configured to determine an ID of the first terminal according to the first request message. The determining unit is further configured to determine a first smart lock bound to the first terminal according to the ID of the first terminal. The first transmitting unit is configured to transmit a first verification parameter to the first terminal and the first smart lock, where the first verification parameter is used for the first terminal to verify an ID of the first smart lock and for the first smart lock to verify the ID of the first terminal when unlocking.

In the above method, a correspondence between the first terminal and the first smart lock bound to the first terminal is stored in the server, and the ID of the first terminal and the ID of the first smart lock can be determined through internal processing. Moreover, in a whole process of implementing unlocking of the first smart lock, unlike identification manners of entering a digital password by a user or collecting a fingerprint, in the disclosure, smart lock unlocking can be implemented through a knocking operation at a door, which is equal to that information such as a digital password entered or a fingerprint can be processed among a server, a terminal, and a smart lock, thereby reducing information subjectively entered by a user and improving efficiency and an accuracy rate of smart lock unlocking, and further greatly improving security of unlocking.

In a possible implementation of the sixth aspect, after transmitting the first verification parameter to the first terminal and the first smart lock, the unlock apparatus further includes the first receiving unit and the first transmitting unit. The first receiving unit is further configured to receive an unlock command transmitted by the first terminal, where the unlock command is transmitted when a verification parameter transmitted by the first smart lock to the first terminal is the first verification parameter. The first transmitting unit is further configured to transmit the unlock command to the first smart lock.

In a possible implementation of the sixth aspect, after receiving the unlock command transmitted by the first terminal, the unlock apparatus further includes the determining unit and a first control unit. The determining unit is further configured to determine a time period from a time point when the first verification parameter is transmitted to a time point when the unlock command is received. The first control unit is configured to trigger the first transmitting unit to transmit the unlock command to the first smart lock, when the time period is less than a preset time period.

In a seventh aspect, embodiments of the disclosure provide another unlock apparatus. The unlock apparatus includes a second receiving unit, a broadcasting unit, and a door-lock control unit. The second receiving unit is configured to receive a first verification parameter transmitted by a server, where the first verification parameter is a verification parameter that is transmitted by the server to a first terminal and the unlock apparatus when the server receives a first request message transmitted by the first terminal. The broadcasting unit is configured to broadcast the first verification parameter, where the first verification parameter broadcasted is used for the first terminal to verify an ID of the unlock apparatus. The second receiving unit is further configured to receive an unlock command transmitted by the server, where the unlock command is transmitted by the first terminal to the server when verification of the ID of the unlock apparatus passes. The door-lock control unit is configured to respond to the unlock command to unlock upon detection of a knocking operation at a door.

Some types of smart locks (e.g., digital password locks) may cost a long operation time when unlocking. In the disclosure, in a process of unlocking of the first smart lock, unlocking of the first smart lock can be implemented through a knocking operation at a door by a user, which reduces manual operations compared to unlocking through entering a digital password, and thus improving an accuracy rate of unlocking because of reduction of manual operations. Moreover, wear and tear of the smart lock is reduced because of reduction of manual operations, and thus service life of the smart lock is improved.

In a possible implementation of the seventh aspect, before responding to the unlock command to unlock, the unlock apparatus further includes a detecting unit and a first determining unit. The detecting unit is configured to detect an angular acceleration of a gyroscope through the gyroscope equipped on the unlock apparatus. The first determining unit is configured to determine that the knocking operation at the door is detected when the angular acceleration reaches a preset angular acceleration.

In an eighth aspect, embodiments of the disclosure provide another unlock apparatus. The unlock apparatus includes a second transmitting unit and a third receiving unit. The second transmitting unit is configured to transmit a first request message to a server. The third receiving unit is configured to receive a first verification parameter transmitted by the server. The third receiving unit is further configured to receive a verification parameter transmitted by a first smart lock. The second transmitting unit is further configured to transmit an unlock command to the server when the verification parameter is the same as the first verification parameter, where the unlock command is used for the server to control unlocking of the first smart lock.

In the above method, the verification parameter may be a random number. Therefore, an accuracy rate of verification can be improved because of randomness of the verification parameter, and randomness of the verification parameter plays an important role in guaranteeing security in a whole process of unlocking.

In a possible implementation of the eighth aspect, before transmitting the first request message to the server, the unlock apparatus further includes a first setting unit, a first judging unit, and a second control unit. The first setting unit is configured to determine a geo-fence region according to a position of the first smart lock. The first judging unit is configured to determine whether the unlock apparatus is located in the geo-fence region. The second control unit is configured to trigger the second transmitting unit to transmit the first request message to the server, when the unlock apparatus is located in the geo-fence region.

After the geo-fence region is determined by a user at the first terminal, operations, e.g. how to determine whether the first terminal is located in the geo-fence region, and what should the first terminal perform when the first terminal is located in the geo-fence region, are processed by the first terminal, and it is unnecessary for the user to perform operations at the first terminal again, thus the method is easy to operate.

In a possible implementation of the eighth aspect, before determining whether the unlock apparatus is located in the geo-fence region, the unlock apparatus further includes a second determining unit, a second judging unit, and a third control unit. The second determining unit is configured to determine a distance between the unlock apparatus and the geo-fence through positioning, where the distance is used for an owner of the unlock apparatus to determine within a range of the distance whether a user of the unlock apparatus is the owner of the unlock apparatus. The second judging unit is configured to determine whether the user of the unlock apparatus is the owner of the unlock apparatus. The third control unit is configured to trigger the first judging unit to determine whether the first terminal is located in the geo-fence region, upon determining that the user of the unlock apparatus is the owner of the unlock apparatus.

It can be understood that, the first terminal determines whether the user of the first terminal is the owner of the first terminal, which can avoid security problems that come with the first terminal being used by others.

In a ninth aspect, embodiments of the disclosure provide yet another unlock apparatus. The unlock apparatus includes a third transmitting unit and a fourth receiving unit. The third transmitting unit is configured to transmit a second request message to a first smart lock, where the second request message is used to request the first smart lock to transmit to the unlock apparatus a first key matched with the first terminal. The fourth receiving unit is configured to receive the first key transmitted by the first smart lock. The third transmitting unit is further configured to transmit an unlock command to the first smart lock through the first key when the first key is the same as a local second key of the unlock apparatus, where the unlock command is used for the unlock apparatus to control unlocking of the first smart lock.

In the above method, in a process that the first terminal controls unlocking of the first smart lock through the first key, the key has high security, thereby greatly guaranteeing safe unlocking of the first smart lock controlled through the key.

In a possible implementation of the ninth aspect, before transmitting the second request message to the first smart lock, the unlock apparatus includes a second setting unit, a third judging unit, and a connecting unit. The second setting unit is configured to determine a geo-fence region according to a position of the first smart lock bound to the unlock apparatus. The third judging unit is configured to determine whether the unlock apparatus is located in the geo-fence region. The connecting unit is configured to connect to the first smart lock when the unlock apparatus is located in the geo-fence region.

In a tenth aspect, embodiments of the disclosure provide yet another unlock apparatus. The unlock apparatus includes a fifth receiving unit, a third determining unit, a fourth transmitting unit, and a responding unit. The fifth receiving unit is configured to receive a second request message transmitted by a first terminal. The third determining unit is configured to determine an ID of the unlock apparatus according to the second request message. The fourth transmitting unit is configured to transmit to the first terminal a first key matched with the first terminal. The fifth receiving unit is further configured to receive an unlock command transmitted by the first terminal, where the unlock command is transmitted by the first terminal to the unlock apparatus when verification of a local second key of the first terminal and the first key passes. The responding unit is configured to respond to the unlock command to unlock upon detection of a knocking operation at a door.

In a process of data interaction between the first terminal and the first smart lock, unlocking of the first smart lock can be implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock, thereby realizing unlocking of the first smart lock without the server.

In an eleventh aspect, embodiments of the disclosure provide an unlock device. The unlock device includes a processor, a memory, and a communication interface. The memory is configured to store program instructions. The processor is configured to invoke the program instructions to execute the following. A first request message transmitted by a first terminal is received through the communication interface. An ID of the first terminal is determined according to the first request message. A first smart lock bound to the first terminal is determined according to the ID of the first terminal. A first verification parameter is transmitted to the first terminal and the first smart lock through the communication interface, where the first verification parameter is used for the first terminal to verify an ID of the first smart lock and for the first smart lock to verify the ID of the first terminal when unlocking.

In the above method, a correspondence between the first terminal and the first smart lock bound to the first terminal is stored in the server, and the ID of the first terminal and the ID of the first smart lock can be determined through internal processing. Moreover, in a whole process of implementing unlocking of the first smart lock, unlike identification manners of entering a digital password by a user or collecting a fingerprint, in the disclosure, smart lock unlocking can be implemented through a knocking operation at a door, which is equal to that information such as a digital password entered or a fingerprint can be processed among a server, a terminal, and a smart lock, thereby reducing information subjectively entered by a user and improving efficiency and an accuracy rate of smart lock unlocking.

In a possible implementation of the eleventh aspect, after transmitting the first verification parameter to the first terminal and the first smart lock, the processor is further configured to execute the following. An unlock command transmitted by the first terminal is received through the communication interface, where the unlock command is transmitted when a verification parameter transmitted by the first smart lock to the first terminal is the first verification parameter. The unlock command is transmitted to the first smart lock through the communication interface.

In a possible implementation of the eleventh aspect, after receiving the unlock command transmitted by the first terminal, the processor is further configured to execute the following. A time period from a time point when the first verification parameter is transmitted to a time point when the unlock command is received is determined. When the time period is less than a preset time period, trigger the transmitting of the unlock command to the first smart lock.

In a twelfth aspect, embodiments of the disclosure provide another unlock device. The unlock device includes a processor, a memory, and a communication interface. The memory is configured to store program instructions. The processor is configured to invoke the program instructions to execute the following. A first verification parameter transmitted by a server is received through the communication interface, where the first verification parameter is a verification parameter that is transmitted by the server to a first terminal and the unlock device when the server receives a first request message transmitted by the first terminal. The first verification parameter is broadcasted, where the first verification parameter broadcasted is used for the first terminal to verify an ID of the unlock device. An unlock command transmitted by the server is received through the communication interface, where the unlock command is transmitted by the first terminal to the server when verification of the ID of the unlock device passes. The unlock command is responded to unlock upon detection of a knocking operation at a door.

Some types of smart locks (e.g., digital password locks) may cost a long operation time when unlocking. In the disclosure, in a process of unlocking of the first smart lock, unlocking of the first smart lock can be implemented through a knocking operation at a door by a user, which reduces manual operations compared to unlocking through entering a digital password, and thus improving an accuracy rate of unlocking because of reduction of manual operations. Moreover, wear and tear of the smart lock is reduced because of reduction of manual operations, and thus service life of the smart lock is improved.

In a possible implementation of the twelfth aspect, before responding to the unlock command to unlock, the processor is further configured to execute the following. An angular acceleration of a gyroscope is detected through the gyroscope equipped on the unlock device. When the angular acceleration reaches a preset angular acceleration, the knocking operation at the door is determined to be detected.

In a thirteenth aspect, embodiments of the disclosure provide another unlock device. The unlock device includes a processor, a memory, and a communication interface. The memory is configured to store program instructions. The processor is configured to invoke the program instructions to execute the following. A first request message is transmitted to a server through the communication interface. A first verification parameter transmitted by the server is received through the communication interface. A verification parameter transmitted by a first smart lock is received through the communication interface. An unlock command is transmitted to the server when the verification parameter is the same as the first verification parameter, where the unlock command is used for the server to control unlocking of the first smart lock.

In the above method, the verification parameter may be a random number. Therefore, an accuracy rate of verification can be improved because of randomness of the verification parameter, and randomness of the verification parameter plays an important role in guaranteeing security in a whole process of unlocking.

In a possible implementation of the thirteenth aspect, before transmitting the first request message to the server, the processor is further configured to execute the following. A geo-fence region is determined according to a position of the first smart lock. It is determined whether the unlock device is located in the geo-fence region. When the unlock device is located in the geo-fence region, proceed to the transmitting of the first request message to the server.

After the geo-fence region is determined by a user at the first terminal, operations, e.g. how to determine whether the first terminal is located in the geo-fence region, and what should the first terminal perform when the first terminal is located in the geo-fence region, are processed by the first terminal, and it is unnecessary for the user to perform operations at the first terminal again, thus that the method is easy to operate.

In a possible implementation of the thirteenth aspect, before determining whether the unlock device is located in the geo-fence region, the processor is further configured to execute the following. A distance between the unlock device and the geo-fence is determined through positioning, where the distance is used for an owner of the unlock device to determine within a range of the distance whether a user of the unlock device is the owner of the unlock device. It is determined whether the user of the unlock device is the owner of the unlock device. Upon determining that the user of the unlock device is the owner of the unlock device, proceed to determining whether the unlock device is located in the geo-fence region.

It can be understood that, the first terminal determines whether the user of the first terminal is the owner of the first terminal, which can avoid security problems that come with the first terminal being used by others.

In a fourteenth aspect, embodiments of the disclosure provide yet another unlock device. The unlock device includes a processor, a memory, and a communication interface. The memory is configured to store program instructions. The processor is configured to invoke the program instructions to execute the following. A second request message is transmitted to a first smart lock through the communication interface, where the second request message is used to request the first smart lock to transmit to the unlock device a first key matched with the first terminal.

The first key transmitted by the first smart lock is received through the communication interface. An unlock command is transmitted to the first smart lock through the first key when the first key is the same as a local second key of the unlock device, where the unlock command is used for the unlock device to control unlocking of the first smart lock.

In the above method, in a process that the first terminal controls unlocking of the first smart lock through the key, the key has high security, thereby greatly guaranteeing safe unlocking of the first smart lock controlled through the key.

In a possible implementation of the fourteenth aspect, before transmitting the second request message to the first smart lock, the processor is further configured to execute the following. A geo-fence region is determined according to a position of the first smart lock bound to the unlock device. It is determined whether the unlock device is located in the geo-fence region. The first smart lock is connected when the unlock device is located in the geo-fence region.

In a fifteenth aspect, embodiments of the disclosure provide yet another unlock device. The unlock device includes a processor, a memory, and a communication interface. The memory is configured to store program instructions. The processor is configured to invoke the program instructions to execute the following. A second request message transmitted by a first terminal is received through the communication interface. An ID of the unlock device is determined according to the second request message. A first key matched with the first terminal is transmitted to the first terminal through the communication interface. An unlock command transmitted by the first terminal is received through the communication interface, where the unlock command is transmitted by the first terminal to the unlock device when verification of a local second key of the first terminal and the first key passes. The unlock command is responded to unlock upon detection of a knocking operation at a door.

In a process of data interaction between the first terminal and the first smart lock, unlocking of the first smart lock can be implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock, thereby realizing unlocking of the first smart lock without the server.

In a sixteenth aspect, embodiments of the disclosure provide a non-transitory computer-readable storage medium. The non-transitory computer-readable storage medium stores computer programs which, when executed by a processor, are operable with the processor to execute the method of the first aspect, the second aspect, the third aspect, the fourth aspect, or the fifth aspect.

Referring to FIG. 1A, FIG. 1A is a schematic architectural diagram illustrating a system for smart lock unlocking provided in embodiments of the disclosure. The system for smart lock unlocking includes a first terminal 101, a server 102, and a first smart lock 103.

The first terminal 101 is an apparatus having a data processing capacity and a data transceiving capacity. The first terminal 101 can generate instructions to implement services of unlocking of the first smart lock 103. For example, the first terminal 101 may be a smart phone, a smart-lock watch, or a tablet computer.

The server 102 is a background support system providing a cloud-service technology for programs in the first terminal 101. The server 102 has a data processing capacity and a data transceiving capacity and is functioned as a hub for the first terminal 101 to implement unlocking of the first smart lock 103 through a network. For example, the server 102 receives an unlock instruction/command transmitted by the first terminal 101 and then transmits the unlock instruction to the first smart lock 103, and the first smart lock 103 responds to the unlock instruction to unlock.

The first smart lock 103 may be a lock derived from a traditionally mechanical lock and a modern technology, which is smarter and simpler in aspects of user security, identification, and management. The first smart lock has a data transceiving capacity. In a process of unlocking of the first smart lock, the first smart lock can receive the unlock instruction transmitted by the server 102 and respond to the unlock instruction to unlock.

For example, data interaction among the first terminal 101, the server 102, and the first smart lock 103 is through the network, thereby realizing unlocking of the first smart lock 103.

Figure 1B:
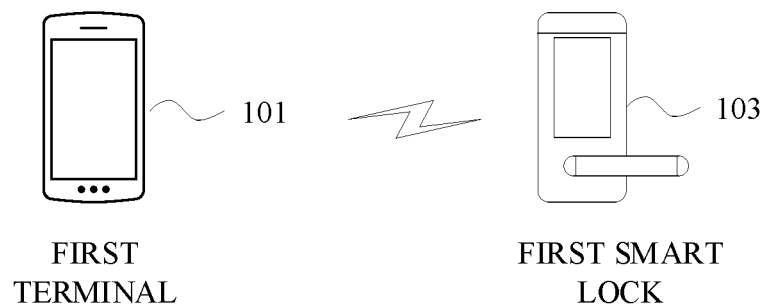
FIG. 1B is a schematic architectural diagram illustrating a system for smart lock unlocking provided in other embodiments of the disclosure.

Referring to FIG. 1B, FIG. 1B is a schematic architectural diagram illustrating a system for smart lock unlocking provided in other embodiments of the disclosure. The system for smart lock unlocking includes a first terminal 101 and a first smart lock 103.

For details of the first terminal 101, reference can be made to the foregoing related illustration, which is not repeated herein.

For details of the first smart lock 103, reference can be made to the foregoing related illustration, which is not repeated herein. In a process of unlocking of the first smart lock, the first smart lock can receive an unlock instruction/command transmitted by the first terminal 101 and respond to the unlock instruction to unlock.

For example, data interaction between the first terminal 101 and the first smart lock 103 is through a Bluetooth protocol, thereby realizing unlocking of the first smart lock 103.

The following will introduce a method of embodiments of the disclosure.

Embodiment 1

Figure 2:
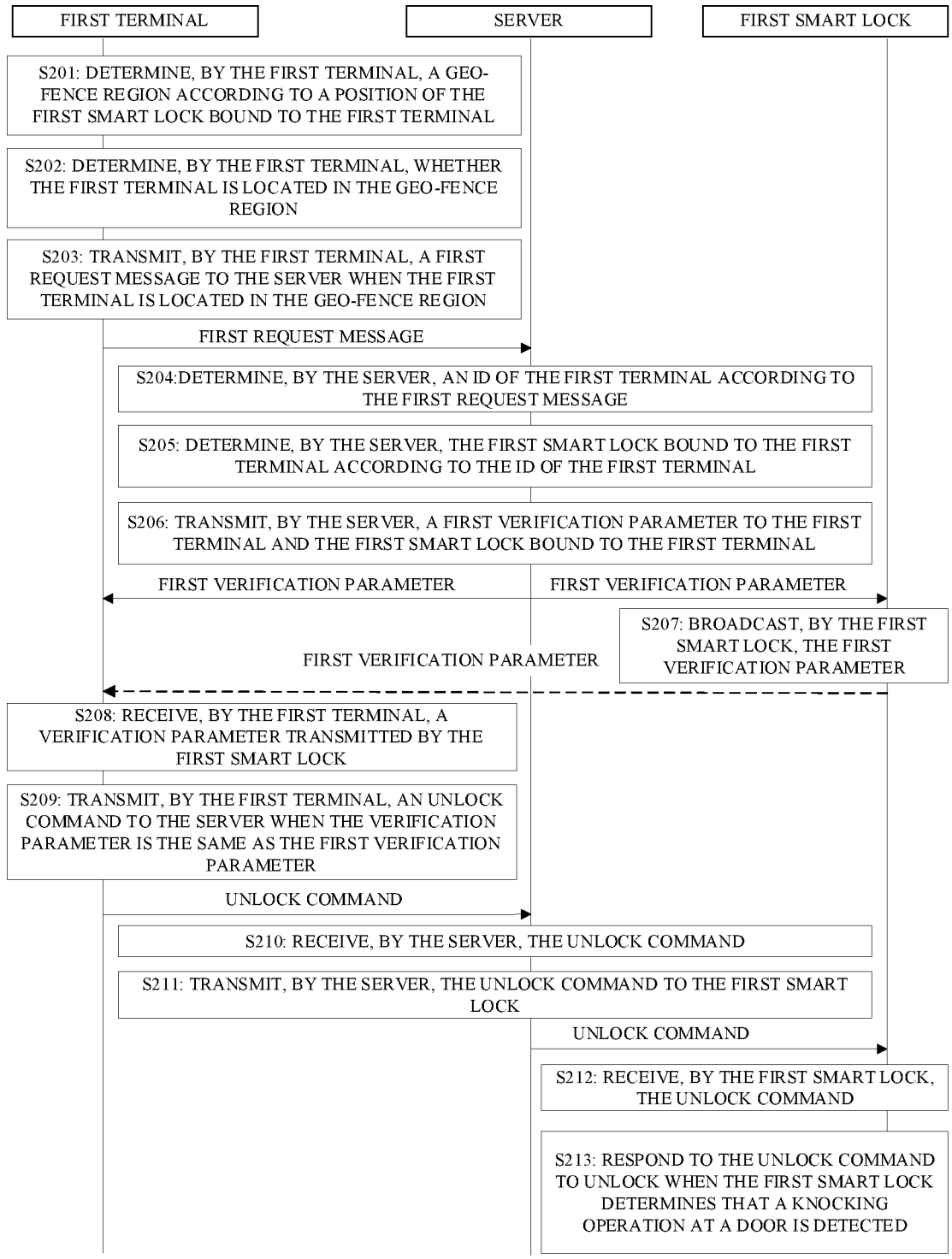
FIG. 2 is a schematic flow chart illustrating a method for smart lock unlocking provided in embodiments of the disclosure.

Referring to FIG. 2, FIG. 2 is a schematic flow chart illustrating a method for smart lock unlocking provided in embodiments of the disclosure. The method can be implemented according to the schematic architecture diagram of the system for smart lock unlocking illustrated in FIG. 1A. The method includes, but is not limited to, the following.

At S201, the first terminal determines a geo-fence region according to a position of the first smart lock bound to the first terminal.

Embodiments of the disclosure are implemented on condition that the first terminal is bound to the first smart lock. Optionally, the first terminal can be bound to the first smart lock through the following manners.

The first terminal is installed with an application (APP), where the APP can be exclusively provided by a manufacturer of the first smart lock, an APP common for multiple manufacturers, or provided by some platforms.

For example, the APP can provide the server with an identity (ID) of a user and/or a mobile equipment identifier (MEID) of the first terminal, the first smart lock provides an ID of the first smart lock for the server, and the server can bind, according to information provided by the two parties, the first terminal to the first smart lock through program control.

The MEID is an identifier of an ID of a network-based mobile communication terminal and is also a unique identification number for each network-based mobile communication terminal or each network-based communication pad. A network side can track and monitor a phone through an identifier of the phone.

There may be multiple first terminals, and the multiple first terminals may be bound to one first smart lock. For example, each of phones of family members of family A can be bound to a smart lock equipped on a door of family A, where each of the phones of the family members of family A is the first terminal, and the smart lock equipped on the door of family A is the first smart lock.

There may be multiple first smart locks, and one first terminal may be bound to the multiple first smart locks. For example, a phone of family member B of family A can be bound to a smart lock equipped on the door of family A and smart locks of rooms of family A, where the phone of family member B is the first terminal, and the smart lock equipped on the door of family A and the smart locks of the rooms of family A each are the first smart lock.

The first terminal may be a smart phone supporting an IOS system, a smart phone supporting an Android system, a smart watch, etc., where a system of a smart phone may be an IOS system or an Android system, which is not limited herein. The IOS system refers to a mobile operating system developed by Apple, and the Android system refers to a mobile operating system developed by Google.

The geo-fence refers to a virtual fence/a virtual geographic boundary. The geo-fence region refers to a region enclosed by a virtual fence/a virtual geographic boundary. A phone can receive an automatic notification and a warning when the phone enters or leaves a specific geographic region or moves in the region. The geo-fence can be determined through an APP of the phone, and the geo-fence region may be determined by drawing a circle with a certain point as a center at an equal distance outwards, and may also be determined by directly outlining an actual shape or a region of a certain district.

In embodiments of the disclosure, the first terminal determines, according to a position of a smart lock, a circular virtual geographic boundary with the smart lock as a center and a preset radius, for example, the preset radius is 200 meters, and for another example, the preset radius is 100 meters. Embodiments of the disclosure exemplarily illustrate determining of the geo-fence region. The geo-fence region may be determined according to a coordinate of the smart lock and a preset radius, or determined by outlining in the APP a region where the smart lock is located, which is not limited herein.

At S202, the first terminal determines whether the first terminal is located in the geo-fence region.

In an optional solution, after the first terminal determines the geo-fence region according to the position of the first smart lock bound to the first terminal, the method further includes the following. The first terminal sets a geo-fence based first monitoring mechanism, where the first monitoring mechanism is used to initiate an APP of the first terminal, so that the APP can interact with the server and the smart lock, which is conducive to realizing unlocking of the smart lock.

It can be understood that, the geo-fence based first monitoring mechanism is used to initiate the APP, and the APP is used to interact with the server and the smart lock, which is conducive to realizing non-inductive unlocking and improving unlocking efficiency.

A manner for determining whether the first terminal is located in the geo-fence region includes, but is not limited to, the two manners as follows.

Manner 1, the first terminal determines whether the first terminal is located in the geo-fence region through a preset algorithm. For example, the geo-fence region is a region enclosed by a circular boundary with the first smart lock as a center at an equal distance outwards, the first terminal determines a position of the first terminal through positioning, and the first terminal can draw on an APP of a phone a line from the position of the first terminal to the position of the first smart lock through the algorithm. If the line drawn intersects with the geo-fence, the first terminal is determined not enter the geo-fence region, otherwise, the first terminal is determined not enter the geo-fence region. A scenario where whether the first terminal is located in the geo-fence region is determined through the preset algorithm can be applied to the IOS system.

Manner 2, the first terminal determines whether the first terminal is located in the geo-fence region according to a positioning-based second monitoring mechanism. For example, the first terminal first obtains a position of the first terminal, monitors a change of the position of the first terminal periodically, and determines a distance between the first terminal and the geo-fence. Periodically monitoring is performed in such a way until the first terminal is monitored to enter the geo-fence region. A scenario where whether the first terminal is located in the geo-fence region is determined through the positioning-based monitoring mechanism of the first terminal can be applied to the Android system.

In an optional solution, before the first terminal determines whether the first terminal is located in the geo-fence region, the method further includes the following. The first terminal determines a distance between the first terminal and the geo-fence through positioning, where the distance is used for an owner of the first terminal to determine within a range of the distance whether a user of the first terminal is the owner of the first terminal. The first terminal determines whether the user of the first terminal is the owner of the first terminal. Upon determining that the user of the first terminal is the owner of the first terminal, proceed to determining whether the first terminal is located in the geo-fence region.

It can be understood that, the first terminal determines whether the user of the first terminal is the owner of the first terminal, which can avoid security problems that come with the first terminal being used by others.

At S203, the first terminal transmits a first request message to the server when the first terminal is located in the geo-fence region.

The APP is initiated to interact with the server when the first terminal is located in the geo-fence region, where a manner for initiating the APP includes, but is not limited to, the following two cases.

Case 1, when the first terminal determines that the first terminal is located in the geo-fence region according to the preset algorithm, the first terminal initiates the APP of the first terminal according to the geo-fence based first monitoring mechanism.

Case 2, the first terminal initiates the APP of the first terminal according to the positioning-based second monitoring mechanism for the first terminal.

For example, the APP of the first terminal performs data interaction with the server through a hyper text transfer protocol secure (HTTPS).

The HTTPS is a transfer protocol for secure communication over a computer network. The HTTPS performs communication via a hyper text transfer protocol (HTTP) and encrypts a data packet using a secure sockets layer (SSL)/transport layer security (TLS). The HTTPS is developed to provide ID authentication for website servers and protect privacy and integrity of exchanged data. The SSL is used to guarantee security of data transmission over an internet, and use of a data encryption technology can ensure that data in a transmission process over a network cannot be intercepted or eavesdropped. The TLS is used to provide confidentiality and data integrity between two communication APPs.

After the APP is initiated, the APP interacts with the server. The APP of the first terminal transmits the first request message to the server, where the first request message contains an ID of the first terminal and an ID of the first smart lock bound to the first terminal. The APP of the first terminal transmits the first request message to the server, which is equivalent to informing the server who it is. The server may transmit a reply message to the APP of the first terminal once the server receives the first request message, to indicate that the server has received the first request message.

At S204, the server determines the ID of the first terminal according to the first request message.

A correspondence between multiple terminals and multiple smart locks is stored in the server, e.g., an ID of terminal A and an ID of smart lock A are stored in the server. As illustrated in Table 1, Table 1 illustrates a correspondence between multiple terminals and multiple smart locks.

TABLE 1 correspondence between multiple terminals and multiple smart locks

| Serial No. | ID of terminal | ID of smart lock |
| --- | --- | --- |
| 1 | 159651892551901 | 891686 |
| 2 | 165169615161962 | 129616 |
| 3 | 195296992612929 | 828929 |
| 4 | 166757257269675 | 767289 |
| 5 | 167565961686126 | 962701 |
| 6 | 128969815696789 | 697826 |

As an example, a terminal with an ID of 159651892551901 is bound to a smart lock with an ID of 891686. For another example, a terminal with an ID of 165169615161962 is bound to a smart lock with an ID of 129616. The server can determine, according to an ID of a terminal, which smart lock is bound to the terminal. The correspondence between the multiple terminals and the multiple smart locks is stored in the server, which indicates that the server knows which terminal is bound to which smart lock. If an ID received by the server form terminal B is 199966699966996, the ID of 199966699966996 is not stored in the server, and thus the server cannot determine the ID of terminal B.

The first request message may contain the ID of the first terminal, and the server can determine the ID of the first terminal according to stored IDs of multiple terminals and the ID of the first terminal in the first request message.

At S205, the server determines the first smart lock bound to the first terminal according to the ID of the first terminal.

After the server determines the ID of the first terminal, the server can determine the first smart lock bound to the first terminal according to the stored correspondence between multiple terminals and multiple smart locks.

At S206, the server transmits a first verification parameter to the first terminal and the first smart lock bound to the first terminal.

The APP of the first terminal transmits to the server an instruction for verification parameter creation after the server determines the first terminal and the first smart lock bound to the first terminal. The server creates the first verification parameter according to the instruction and replies to the APP with a message that verification parameter creation is successful. The first verification parameter is used for the APP of the first terminal to verify the ID of the first smart lock and for the first smart lock to verify the ID of the first terminal when unlocking. The first verification parameter may be a random number.

The server transmits the first verification parameter to the APP of the first terminal and the first smart lock bound to the first terminal after the server creates the first verification parameter. The APP transmits a reply to the server once the APP receives the first verification parameter, to indicate that the APP has received the verification parameter. Also, the first smart lock transmits a reply to the server once the first smart lock receives the first verification parameter, to indicate that the first smart lock has received the verification parameter.

For example, data interaction between the server and the first smart lock is through a message queuing telemetry transport (MQTT).

The MQTT is a client server publish-subscribe based messaging protocol. A greatest advantage of the MQTT is to provide a real-time and reliable message service for connecting a remote device with extremely little codes and limited bandwidths. As an instant messaging protocol with low overhead and low bandwidth occupation, the MQTT is widely applied to the internet of things, small devices, mobile applications, and other aspects.

At S207, the first smart lock broadcasts the first verification parameter.

The server feeds back to the APP a message that transmission of the first verification parameter is successful after the server receives the reply of the APP and the reply of the first smart lock, such that the APP can transmit a broadcast instruction to the first smart lock through the server.

The first smart lock broadcasts the first verification parameter after the first smart lock receives the broadcast instruction. The first smart lock may place the first verification parameter into broadcast data for iBeacon broadcast.

The iBeacon is a Bluetooth low energy (BLE) technology. For an operating mode of the iBeacon, a device equipped with a BLE communication function transmits a unique ID of the device to surroundings of the device with the BLE technology, and application software receiving the ID may take actions according to the ID. For example, a smart lock equipped with an iBeacon communication module transmits an ID of the smart lock to surroundings of the smart lock through the iBeacon, an APP of a phone receives the ID of the smart lock, and the phone can transmit instructions to the smart lock according to the ID of the smart lock. The BLE is a personal local area network technology designed and sold by the Bluetooth Technology Alliance for emerging applications in healthcare, sports and fitness, beacon, security, home entertainment, and more. Compared with a traditional Bluetooth technology, the BLE aims to significantly reduce power consumption and costs while maintaining a same communication range.

In embodiments of the disclosure, the first smart lock broadcasts the first verification parameter through iBeacon. It can be understood that, the first smart lock broadcasts through the iBeacon technology, which greatly reduces power consumption of the first smart lock compared to the traditional Bluetooth technology.

At S208, the first terminal receives a verification parameter transmitted by the first smart lock.

When the first smart lock successfully broadcasts, the first smart lock feeds back to the APP via the server a message of successful broadcasting. The APP starts to monitor broadcast data once the APP receives a reply that the first smart lock successfully broadcasts.

It can be understood that, the APP starts to monitor the broadcast data after the APP receives the reply that the smart lock successfully broadcasts, which can avoid a memory problem caused by monitoring unnecessary broadcast data too early, or a problem of monitoring the broadcast data too late to receive necessary broadcast data.

Specifically, the broadcast data carries a verification parameter, and the APP of the first terminal receives the verification parameter transmitted by the first smart lock according to the verification parameter carried in the broadcast data monitored, where the verification parameter carried may be the first verification parameter or may not be the first verification parameter.

The broadcast data monitored by the APP of the first terminal may come from multiple smart locks. For example, the first smart lock, smart lock A, smart lock B, and smart lock C broadcast, and broadcast data of these smart locks may be monitored by the APP.

However, the first smart lock corresponds to the APP of the first terminal, and thus the APP of the first terminal needs to analyze the broadcast data monitored, to determine whether a parameter carried in each piece of broadcast data is the same as the local first verification parameter.

At S209, the first terminal transmits an unlock command to the server if the verification parameter is the same as the first verification parameter.

The APP of the first terminal transmits the unlock command to the server if the verification parameter in the broadcast data of the first smart lock is the same as the local first verification parameter of the APP of the first terminal. For example, the APP transmits the unlock command to the server through the HTTPS.

Conversely, if the verification parameter is different from the first verification parameter, the APP can control a switch (e.g., disenabling) of broadcast data monitoring and a switch (e.g., non-creation) of the geo-fence through program control, to end monitoring of the broadcast data and eliminate the geo-fence.

In an optional solution, the APP transmits a request message to the server if the verification parameter is different from the first verification parameter. The server obtains a status of the first smart lock according to the request message, and feeds back the status of the first smart lock to the APP, such that the APP can know the status of the first smart lock, and the first smart lock can be adjusted by a user of the APP according to the status of the first smart lock.

At S210, the server receives the unlock command.

At S211, the server transmits the unlock command to the first smart lock.

Once the server receives the unlock command, the server can determine a time period from a time point when the server transmits the first verification parameter to a time point when the server receives the unlock command. The server transmits the unlock command to the first smart lock through the MQTT if the time period is less than a preset time period.

The preset time period for example is 3 minutes, the server transmits the unlock command to the first smart lock when the time period is less than 3 minutes. It can be understood that, a poor experience of a user caused by long waiting time can be effectively avoided by setting the preset time period.

At S212, the first smart lock receives the unlock command.

When the first smart lock receives the unlock command, the first smart lock feeds back to the server a message that the unlock command is received, and starts to detect a knocking operation at a door.

The door is knocked at different strengths by a user who uses the APP, and a gyroscope equipped on the first smart lock is configured to detect an angular acceleration of the gyroscope in an effective time period, to determine whether the knocking operation at the door is detected. Specifically, the knocking operation at the door is determined to be detected if an angular acceleration detected reaches the preset angular acceleration.

The gyroscope refers to an angular motion detection apparatus that uses a momentum moment-sensitive housing of a rapidly spinning body to rotate about one or two axes relative to an inertial space, where the one or two axes are orthogonal to a spin axis. An angular motion detection apparatus manufactured in other principles and functioned the same as the above gyroscope can also be called a gyroscope.

At S213, the first smart lock responds to the unlock command to unlock, when the first smart lock determines that the knocking operation at the door is detected.

After the first smart lock is unlocked successfully, the first smart lock transmits to the server a message of successful unlocking, the server forwards the message of successful unlocking to the APP, and the APP eliminates the geo-fence.

According to embodiments of the disclosure, after the first terminal determines the geo-fence region according to the position of the first smart lock bound to the first terminal, in a process of data interaction among the first terminal, the server, and the first smart lock, unlocking of the first smart lock can be implemented by performing the knocking operation at the door by a user when the user walks to the first smart lock, thereby greatly reducing information subjectively entered by the user and improving an accuracy rate of unlocking in the process.

Embodiment 2

Figure 3:
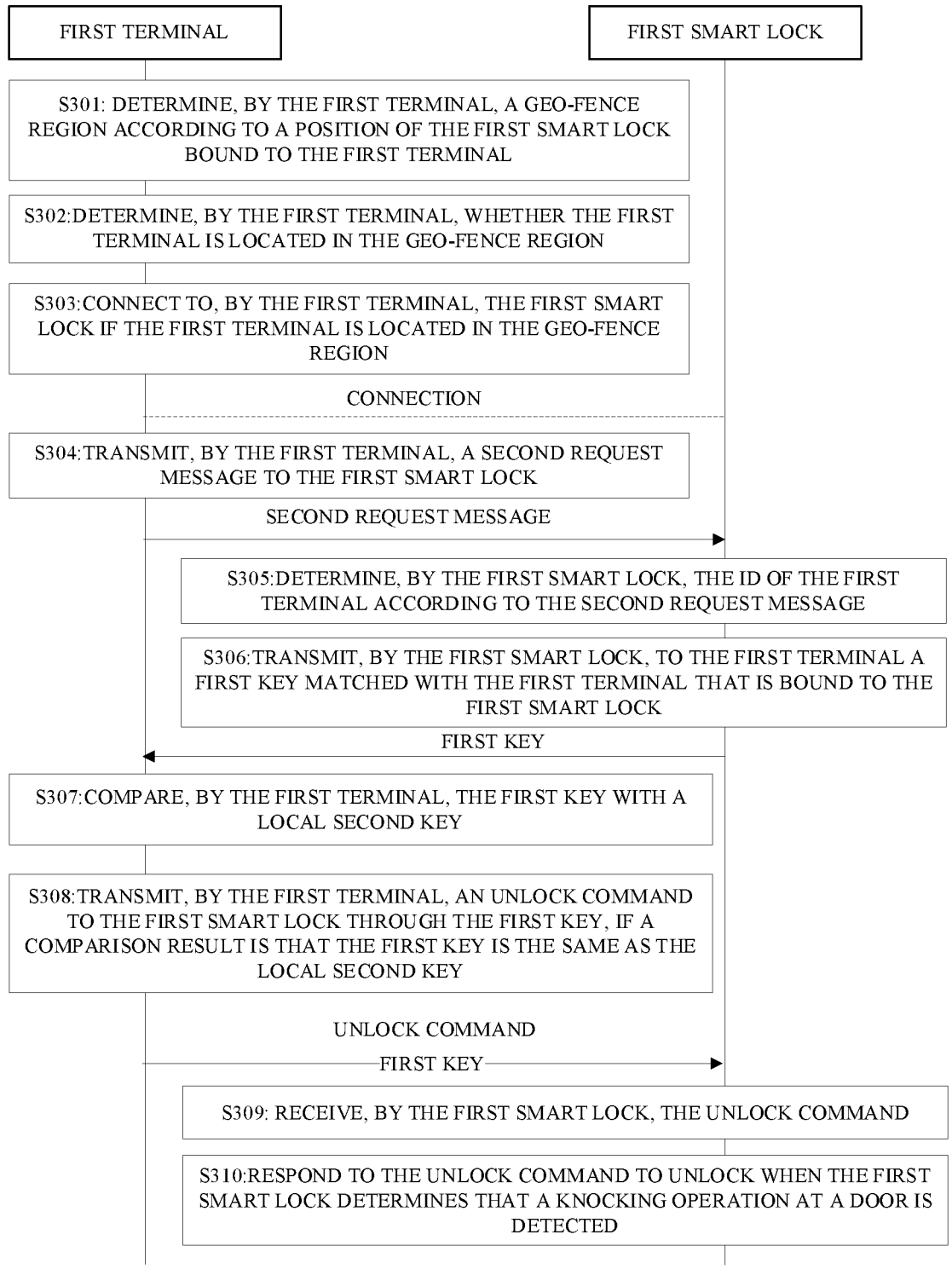
FIG. 3 is a schematic flow chart illustrating a method for smart lock unlocking provided in other embodiments of the disclosure.

Referring to FIG. 3, FIG. 3 is a schematic flow chart illustrating a method for smart lock unlocking provided in other embodiments of the disclosure. The method for smart lock unlocking illustrated in FIG. 3 can be implemented according to the schematic architecture diagram of the system for smart lock unlocking illustrated in FIG. 1B. The method includes, but is not limited to, the following.

The method for smart lock unlocking illustrated in FIG. 3 includes operations from S301 to S310.

For details of the operations at S301 and S302, reference can be made to the related illustration in the foregoing operations at S201 and S202, which is not repeated herein.

At S301, the first terminal determines a geo-fence region according to a position of the first smart lock bound to the first terminal.

An APP of the first terminal is used to interact with a smart lock, to implement unlocking of the smart lock.

At S302, the first terminal determines whether the first terminal is located in the geo-fence region.

At S303, the first terminal connects to the first smart lock if the first terminal is located in the geo-fence region.

For example, the APP of the first terminal connects to the first smart lock through Bluetooth.

Optionally, the APP of the first terminal connects to the first smart lock when the APP of the first terminal monitors a Bluetooth-based broadcast of the first smart lock.

Optionally, the APP of the first terminal connects to the first smart lock through Bluetooth when the first terminal is close to an effective range of the first smart lock, where the effective range refers to a range in which the APP of the first terminal can establish a Bluetooth-based connection with the first smart lock.

At S304, the first terminal transmits a second request message to the first smart lock.

Data interaction between the APP of the first terminal and the first smart lock may be through a Bluetooth protocol.

The second request message contains an ID of the first terminal and an ID of the first smart lock bound to the first terminal. The second request message is used for the first smart lock to determine the ID of the first terminal.

At S305, the first smart lock determines the ID of the first terminal according to the second request message.

The ID of the first smart lock and the ID of the first terminal bound to the first smart lock are stored in an APP of the first smart lock.

The APP of the first smart lock compares the ID of the first terminal in the received second request message with the ID of the first terminal locally stored in the APP of the first smart lock, and compares the ID of the first smart lock in the received second request message with the ID of the first smart lock locally stored in the APP of the first smart lock. If same, the first smart lock determines that the ID of the first terminal is legal, and the first smart lock allows the APP of the first terminal to control the first smart lock. If different, the first smart lock determines that the ID of the first terminal is illegal, and the first smart lock does not allow the APP of the first terminal to control the first smart lock.

No matter whether the ID of the first terminal is legal, the first smart lock can reply to the APP of the first terminal a message to inform whether the ID of the first terminal is legal.

At S306, the first smart lock transmits to the first terminal a first key matched with the first terminal that is bound to the first smart lock.

The first key matched with the first terminal that is bound to the first smart lock is stored in the first smart lock, and the first key is used for the APP of the first terminal to control the first smart lock through the key.

The first smart lock transmits the key to the APP of the first terminal after the first smart lock determines the ID of the first terminal, such that the APP of the first terminal can control the first smart lock through the key.

At S307, the first terminal compares the first key with a local second key.

A key matched with the first smart lock that is bound to the first terminal is stored in the APP of the first terminal.

The first terminal may be bound to multiple smart locks, but a key between the first terminal and each smart lock is unique and encrypted, and the key has higher security, thereby improving security of unlocking of the first smart lock controlled by the first terminal through the key.

At S308, the first terminal transmits an unlock command to the first smart lock through the first key, if a comparison result is that the first key is the same as the local second key.

At S309, the first smart lock receives the unlock command.

Once the first smart lock receives the unlock command, the first smart lock feeds back to the APP of the first terminal a message that the unlock command is received, and starts to detect a knocking operation at a door.

Optionally, after the first smart lock receives the unlock command, the first smart lock determines a time period from a time point when the first smart lock transmits the key to a time point when the first smart lock receives the unlock command. If the time period is less than a preset time period, the first smart lock starts to detect the knocking operation at the door.

A gyroscope equipped on the first smart lock is configured to detect an angular acceleration of the gyroscope in an effective time period. The first smart lock determines that the knocking operation at the door is detected when the angular acceleration reaches a preset angular acceleration.

At S310, the first smart lock responds to the unlock command to unlock when the first smart lock determines that the knocking operation at the door is detected.

After the first smart lock unlocks successfully, the first smart lock transmits to the APP a message of unlocking successfully, and the APP eliminates the geo-fence.

According to embodiments of the disclosure, after the first terminal determines the geo-fence region according to the position of the first smart lock bound to the first terminal, in a process of data interaction between the first terminal and the first smart lock, unlocking of the first smart lock is implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock through the Bluetooth protocol, thereby realizing unlocking of the first smart lock without the internet.

The above illustrates the method of embodiments of the disclosure in detail, and the following will provide an apparatus of embodiments of the disclosure.

Figure 4:
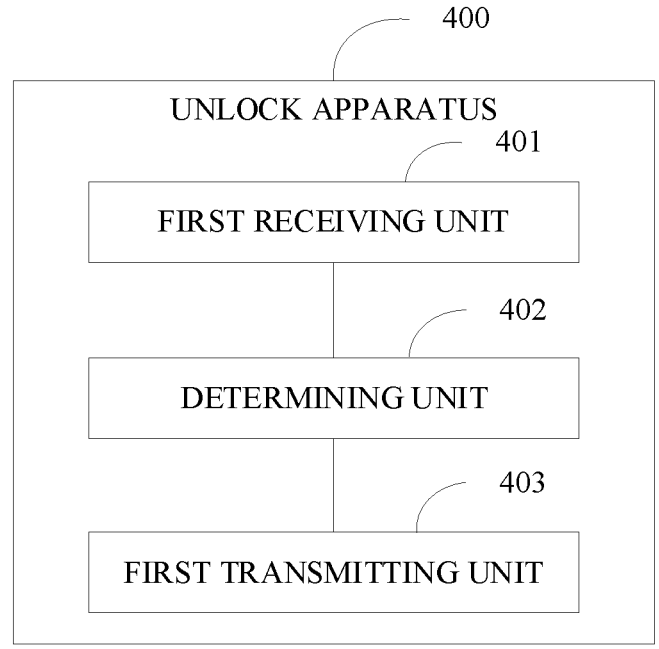
FIG. 4 is a schematic structural diagram illustrating an unlock apparatus provided in embodiments of the disclosure.

Referring to FIG. 4, FIG. 4 is a schematic structural diagram illustrating an unlock apparatus 400 provided in embodiments of the disclosure. The unlock apparatus 400 can be the above server or a component or a functional module of the server. The unlock apparatus 400 includes a first receiving unit 401, a determining unit 402, and a first transmitting unit 403, where each unit will be illustrated in detail as follows. The first receiving unit 401 is configured to receive a first request message transmitted by a first terminal. The determining unit 402 is configured to determine an ID of the first terminal according to the first request message. The determining unit 402 is further configured to determine a first smart lock bound to the first terminal according to the ID of the first terminal. The first transmitting unit 403 is configured to transmit a first verification parameter to the first terminal and the first smart lock, where the first verification parameter is used for the first terminal to verify an ID of the first smart lock and for the first smart lock to verify the ID of the first terminal when unlocking.

In the above method, a correspondence between the first terminal and the first smart lock bound to the first terminal is stored in the server, and the ID of the first terminal and the ID of the first smart lock can be determined through internal processing. Moreover, in a whole process of implementing unlocking of the first smart lock, unlike identification manners of entering a digital password by a user or collecting a fingerprint, in the disclosure, smart lock unlocking can be implemented through a knocking operation at a door, which is equal to that information such as a digital password entered or a fingerprint can be processed among a server, a terminal, and a smart lock, thereby reducing information subjectively entered by a user and improving efficiency and an accuracy rate of smart lock unlocking, and further greatly improving security of unlocking.

In an optional solution, after transmitting the first verification parameter to the first terminal and the first smart lock, the unlock apparatus 400 further includes the first receiving unit 401 and the first transmitting unit 403. The first receiving unit 401 is further configured to receive an unlock command transmitted by the first terminal, where the unlock command is transmitted when a verification parameter transmitted by the first smart lock to the first terminal is the first verification parameter. The first transmitting unit 403 is further configured to transmit the unlock command to the first smart lock.

In an optional solution, after receiving the unlock command transmitted by the first terminal, the unlock apparatus 400 further includes the determining unit 402 and a first control unit. The determining unit 402 is further configured to determine a time period from a time point when the first verification parameter is transmitted to a time point when the unlock command is received. The first control unit is configured to trigger the first transmitting unit 403 to transmit the unlock command to the first smart lock, when the time period is less than a preset time period.

Figure 5:
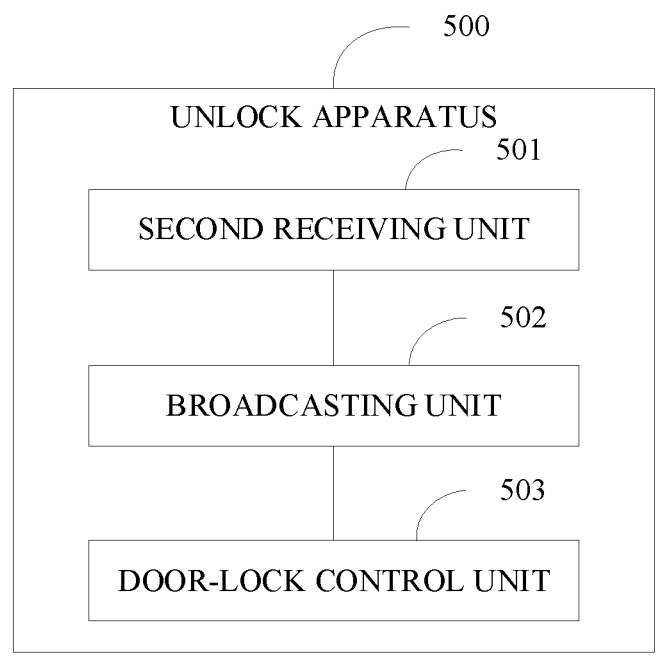
FIG. 5 is a schematic structural diagram illustrating an unlock apparatus provided in other embodiments of the disclosure.

Referring to FIG. 5, FIG. 5 is a schematic structural diagram illustrating an unlock apparatus 500 provided in other embodiments of the disclosure. The unlock apparatus 500 can be the above first smart lock or a component or a functional module of the first smart lock. The unlock apparatus 500 includes a second receiving unit 501, a broadcasting unit 502, and a door-lock control unit 503, where each unit will be illustrated in detail as follows. The second receiving unit 501 is configured to receive a first verification parameter transmitted by a server, where the first verification parameter is a verification parameter that is transmitted by the server to a first terminal and the unlock apparatus 500 when the server receives a first request message transmitted by the first terminal. The broadcasting unit 502 is configured to broadcast the first verification parameter, where the first verification parameter broadcasted is used for the first terminal to verify an ID of the unlock apparatus 500. The second receiving unit 501 is further configured to receive an unlock command transmitted by the server, where the unlock command is transmitted by the first terminal to the server when verification of the ID of the unlock apparatus 500 passes. The door-lock control unit 503 is configured to respond to the unlock command to unlock upon detection of a knocking operation at a door.

Some types of smart locks (e.g., digital password locks) may cost a long operation time when unlocking. In the disclosure, in a process of unlocking of the first smart lock, unlocking of the first smart lock can be implemented through a knocking operation at a door by a user, which reduces manual operations compared to unlocking through entering a digital password, and thus improving an accuracy rate of unlocking because of reduction of manual operations. Moreover, wear and tear of the smart lock is reduced because of reduction of manual operations, and thus service life of the smart lock is improved.

In an optional solution, before responding to the unlock command to unlock, the unlock apparatus 500 further includes a detecting unit and a first determining unit. The detecting unit is configured to detect an angular acceleration of a gyroscope through the gyroscope equipped on the unlock apparatus 500. The first determining unit is configured to determine that the knocking operation at the door is detected when the angular acceleration reaches a preset angular acceleration.

Figure 6:
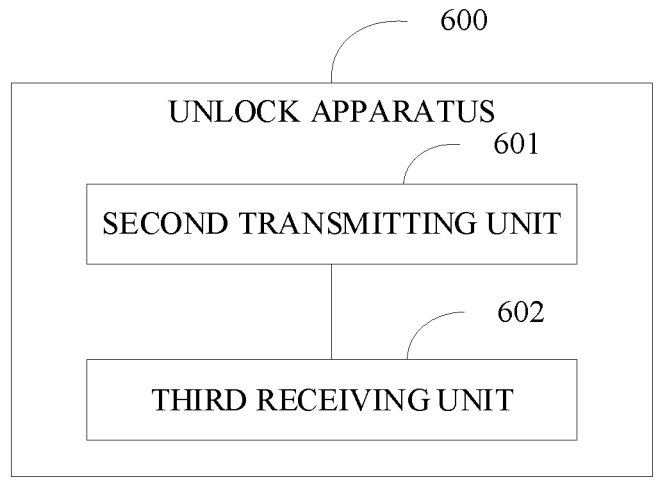
FIG. 6 is a schematic structural diagram illustrating an unlock apparatus provided in other embodiments of the disclosure.

Referring to FIG. 6, FIG. 6 is a schematic structural diagram illustrating an unlock apparatus 600 provided in other embodiments of the disclosure. The unlock apparatus 600 can be the above first terminal or a component or a functional module of the first terminal. The unlock apparatus 600 includes a second transmitting unit 601 and a third receiving unit 602, where each unit will be illustrated in detail as follows. The second transmitting unit 601 is configured to transmit a first request message to a server. The third receiving unit 602 is configured to receive a first verification parameter transmitted by the server. The third receiving unit 602 is further configured to receive a verification parameter transmitted by a first smart lock. The second transmitting unit 601 is further configured to transmit an unlock command to the server when the verification parameter is the same as the first verification parameter, where the unlock command is used for the server to control unlocking of the first smart lock.

In the above method, the verification parameter may be a random number. Therefore, an accuracy rate of verification can be improved because of randomness of the verification parameter, and randomness of the verification parameter plays an important role in guaranteeing security in a whole process of unlocking.

In an optional solution, before transmitting the first request message to the server, the unlock apparatus 600 further includes a first setting unit, a first judging unit, and a second control unit. The first setting unit is configured to determine a geo-fence region according to a position of the first smart lock. The first judging unit is configured to determine whether the unlock apparatus 600 is located in the geo-fence region. The second control unit is configured to trigger the second transmitting unit 601 to transmit the first request message to the server, when the unlock apparatus 600 is located in the geo-fence region.

After the geo-fence region is determined by a user at the first terminal, operations, e.g. how to determine whether the first terminal is located in the geo-fence region, and what should the first terminal perform when the first terminal is located in the geo-fence region, are processed by the first terminal, and it is unnecessary for the user to perform operations at the first terminal again, thus the method is easy to operate.

In an optional solution, before determining whether the unlock apparatus is located in the geo-fence region, the unlock apparatus further includes a second determining unit, a second judging unit, and a third control unit. The second determining unit is configured to determine a distance between the unlock apparatus and the geo-fence through positioning, where the distance is used for an owner of the unlock apparatus to determine within a range of the distance whether a user of the unlock apparatus is the owner of the unlock apparatus. The second judging unit is configured to determine whether the user of the unlock apparatus is the owner of the unlock apparatus. The third control unit is configured to trigger the first judging unit to determine whether the first terminal is located in the geo-fence region, upon determining that the user of the unlock apparatus is the owner of the unlock apparatus.

It can be understood that, the first terminal determines whether the user of the first terminal is the owner of the first terminal, which can avoid security problems that come with the first terminal being used by others.

Figure 7:
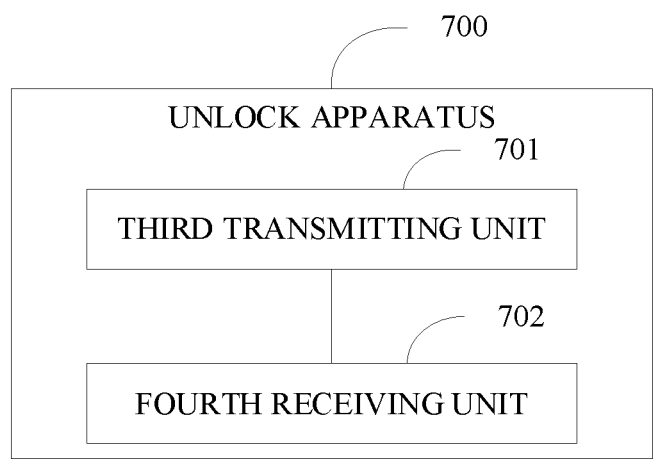
FIG. 7 is a schematic structural diagram illustrating an unlock apparatus provided in other embodiments of the disclosure.

Referring to FIG. 7, FIG. 7 is a schematic structural diagram illustrating an unlock apparatus 700 provided in other embodiments of the disclosure. The unlock apparatus 700 can be the above first terminal or a component or a functional module of the first terminal. The unlock apparatus 700 includes a third transmitting unit 701 and a fourth receiving unit 702, where each unit will be illustrated in detail as follows. The third transmitting unit 701 is configured to transmit a second request message to a first smart lock, where the second request message is used to request the first smart lock to transmit to the unlock apparatus 700 a first key matched with the first terminal. The fourth receiving unit 702 is configured to receive the first key transmitted by the first smart lock. The third transmitting unit 701 is further configured to transmit an unlock command to the first smart lock through the key when the first key is the same as a local second key of the unlock apparatus 700, where the unlock command is used for the unlock apparatus 700 to control unlocking of the first smart lock.

In the above method, in a process that the first terminal controls unlocking of the first smart lock through the key, the key has high security, thereby greatly guaranteeing safe unlocking of the first smart lock controlled through the key.

In an optional solution, before transmitting the second request message to the first smart lock, the unlock apparatus 700 further includes a second setting unit, a third judging unit, and a connecting unit. The second setting unit is configured to determine a geo-fence region according to a position of the first smart lock bound to the unlock apparatus. The third judging unit is configured to determine whether the unlock apparatus is located in the geo-fence region. The connecting unit is configured to connect to the first smart lock when the unlock apparatus is located in the geo-fence region.

Figure 8:
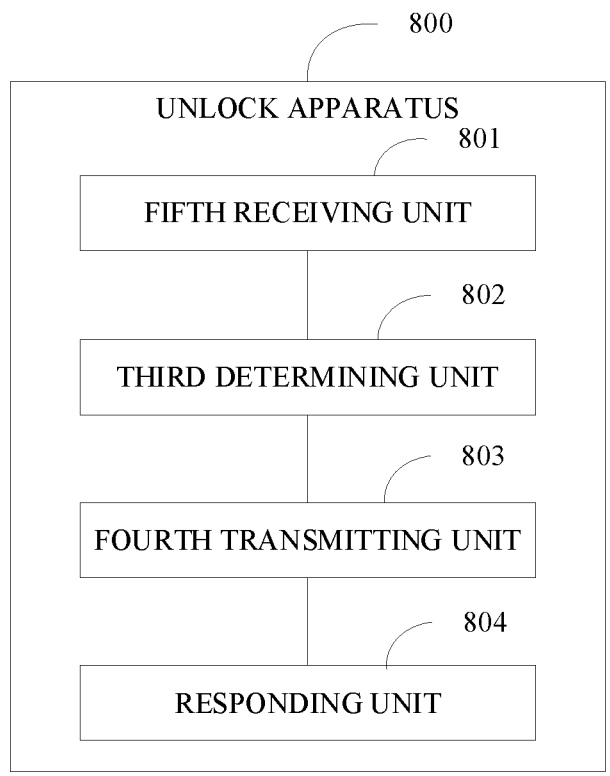
FIG. 8 is a schematic structural diagram illustrating an unlock apparatus provided in other embodiments of the disclosure.

Referring to FIG. 8, FIG. 8 is a schematic structural diagram illustrating an unlock apparatus 800 provided in other embodiments of the disclosure. The unlock apparatus 800 can be the above first smart lock or a component or a functional module of the first smart lock. The unlock apparatus 800 includes a fifth receiving unit 801, a third determining unit 802, a fourth transmitting unit 803, and a responding unit 804, where each unit will be illustrated in detail as follows. The fifth receiving unit 801 is configured to receive a second request message transmitted by a first terminal. The third determining unit 802 is configured to determine an ID of the unlock apparatus according to the second request message. The fourth transmitting unit 803 is configured to transmit to the first terminal a first key matched with the first terminal. The fifth receiving unit 801 is further configured to receive an unlock command transmitted by the first terminal, where the unlock command is transmitted by the first terminal to the unlock apparatus when verification of a local second key of the first terminal and the first key passes. The responding unit 804 is configured to respond to the unlock command to unlock upon detection of a knocking operation at a door.

In a process of data interaction between the first terminal and the first smart lock, unlocking of the first smart lock can be implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock, thereby realizing unlocking of the first smart lock without the server.

Figure 9:
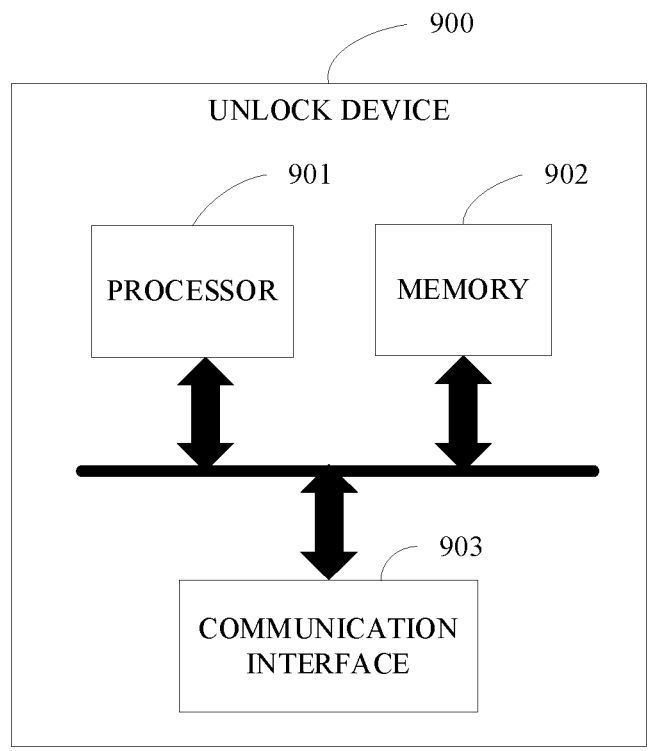
FIG. 9 is a schematic structural diagram illustrating an unlock device provided in embodiments of the disclosure.

Referring to FIG. 9, FIG. 9 is a schematic structural diagram illustrating an unlock device 900 provided in embodiments of the disclosure. The unlock device 900 may be the above server or a component or a functional module of the server. The unlock device 900 includes a processor 901, a memory 902, and a communication interface 903, where the processor 901, the memory 902, and the communication interface 903 are coupled with one other via a bus 904.

The processor 901 may be one or more central processing units (CPUs). If the processor 901 is one CPU, the CPU may be a single-core CPU or a multicore CPU.

The memory 902 includes, but is not limited to, a random access memory (RAM), a read-only memory (ROM), an erasable programmable read-only memory (EPROM), or a compact disc read-only memory (CD-ROM). The memory 902 is configured to store related instructions and data. The communication interface 903 is configured to receive and transmit data.

The processor 901 in the unlock device 900 is configured to read out program instructions stored in the memory 902 to execute the following. A first request message transmitted by a first terminal is received through the communication interface 903. An ID of the first terminal is determined according to the first request message. A first smart lock bound to the first terminal is determined according to the ID of the first terminal. A first verification parameter is transmitted to the first terminal and the first smart lock through the communication interface 903, where the first verification parameter is used for the first terminal to verify an ID of the first smart lock and for the first smart lock to verify the ID of the first terminal when unlocking.

In the above method, a correspondence between the first terminal and the first smart lock bound to the first terminal is stored in the server, and the ID of the first terminal and the ID of the first smart lock can be determined through internal processing. Moreover, in a whole process of implementing unlocking of the first smart lock, unlike identification manners of entering a digital password by a user or collecting a fingerprint, in the disclosure, smart lock unlocking can be implemented through a knocking operation at a door, which is equal to that information such as a digital password entered or a fingerprint can be processed among a server, a terminal, and a smart lock, thereby reducing information subjectively entered by a user and improving efficiency and an accuracy rate of smart lock unlocking.

In an optional solution, after transmitting the first verification parameter to the first terminal and the first smart lock, the processor 901 is further configured to execute the following. An unlock command transmitted by the first terminal is received through the communication interface 903, where the unlock command is transmitted when a verification parameter transmitted by the first smart lock to the first terminal is the first verification parameter. The unlock command is transmitted to the first smart lock through the communication interface 903.

In an optional solution, after receiving the unlock command transmitted by the first terminal, the processor 901 is further configured to execute the following. A time period from a time point when the first verification parameter is transmitted to a time point when the unlock command is received is determined. When the time period is less than a preset time period, trigger the transmitting of the unlock command to the first smart lock.

Figure 10:
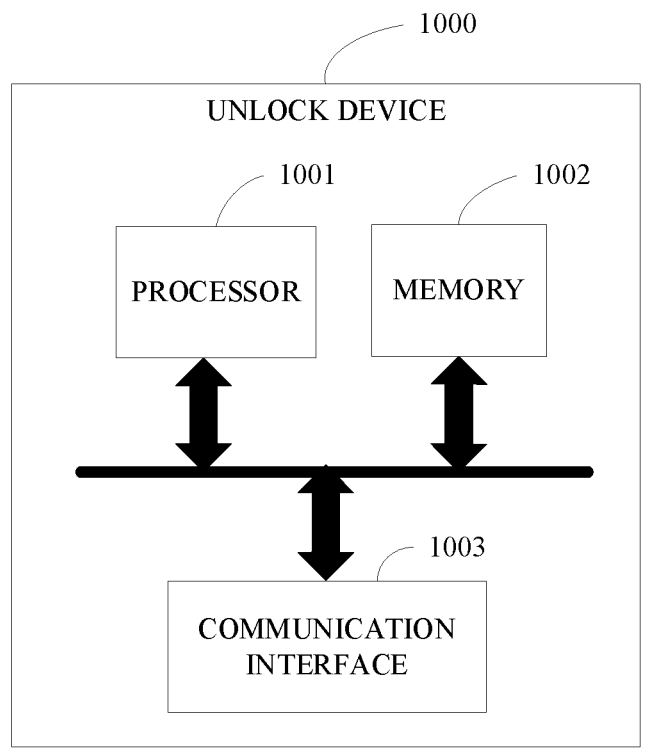
FIG. 10 is a schematic structural diagram illustrating an unlock device provided in other embodiments of the disclosure.

Referring to FIG. 10, FIG. 10 is a schematic structural diagram illustrating an unlock device 1000 provided in other embodiments of the disclosure. The unlock device 1000 may be the above first smart lock or a component or a functional module of the first smart lock. The unlock device 1000 includes a processor 1001, a memory 1002, and a communication interface 1003, where the processor 1001, the memory 1002, and the communication interface 1003 are coupled with one other via a bus 1004.

The processor 1001 may be one or more CPUs. If the processor 1001 is one CPU, the CPU may be a single-core CPU or a multicore CPU.

The memory 1002 includes, but is not limited to, an RAM, an ROM, an EPROM, or a CD-ROM. The memory 1002 is configured to store related instructions and data. The communication interface 1003 is configured to receive and transmit data.

The processor 1001 in the unlock device 1000 is configured to read out program instructions stored in the memory 1002 to execute the following. A first verification parameter transmitted by a server is received through the communication interface 1003, where the first verification parameter is a verification parameter that is transmitted by the server to a first terminal and the unlock device 1000 when the server receives a first request message transmitted by the first terminal. The first verification parameter is broadcasted, where the first verification parameter broadcasted is used for the first terminal to verify an ID of the unlock device 1000. An unlock command transmitted by the server is received through the communication interface 1003, where the unlock command is transmitted by the first terminal to the server when verification of the ID of the unlock device 1000 passes. The unlock command is responded to unlock upon detection of a knocking operation at a door.

Some types of smart locks (e.g., digital password locks) may cost a long operation times when unlocking. In the disclosure, in a process of unlocking of the first smart lock, unlocking of the first smart lock can be implemented through a knocking operation at a door by a user, which reduces manual operations compared to unlocking through entering a digital password, and thus improving an accuracy rate of unlocking because of reduction of manual operations. Moreover, wear and tear of the smart lock is reduced because of reduction of manual operations, and service life of the smart lock is improved.

In an optional solution, before responding to the unlock command to unlock, the processor 1001 is further configured to execute the following. An angular acceleration of a gyroscope is detected through the gyroscope equipped on the unlock device 1000. When the angular acceleration reaches a preset angular acceleration, the knocking operation at the door is determined to be detected.

Figure 11:
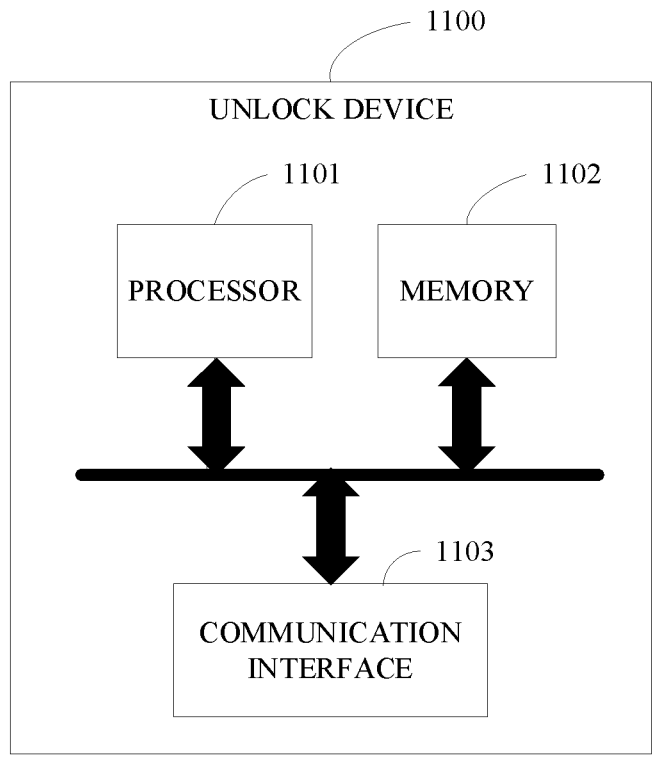
FIG. 11 is a schematic structural diagram illustrating an unlock device provided in other embodiments of the disclosure.

Referring to FIG. 11, FIG. 11 is a schematic structural diagram illustrating an unlock device 1100 provided in other embodiments of the disclosure. The unlock device 1100 may be the above first terminal or a component or a functional module of the first terminal. The unlock device 1100 includes a processor 1101, a memory 1102, and a communication interface 1103, where the processor 1101, the memory 1102, and the communication interface 1103 are coupled with one other via a bus 1104.

The processor 1101 may be one or more CPUs. If the processor 1101 is one CPU, the CPU may be a single-core CPU or a multicore CPU.

The memory 1102 includes, but is not limited to, an RAM, an ROM, an EPROM, or a CD-ROM. The memory 1102 is configured to store related instructions and data. The communication interface 1103 is configured to receive and transmit data.

The processor 1101 in the unlock device 1100 is configured to read out program instructions stored in the memory 1102 to execute the following. A first request message is transmitted to a server through the communication interface 1103. A first verification parameter transmitted by the server is received through the communication interface 1103. A verification parameter transmitted by a first smart lock is received through the communication interface 1103. An unlock command is transmitted to the server when the verification parameter is the same as the first verification parameter, where the unlock command is used for the server to control unlocking of the first smart lock.

In the above method, the verification parameter may be a random number. Therefore, an accuracy rate of verification can be improved because of randomness of the verification parameter, and randomness of the verification parameter plays an important role in guaranteeing security in a whole process of unlocking.

In an optional solution, before transmitting the first request message to the server, the processor 1101 is further configured to execute the following. A geo-fence region is determined according to a position of the first smart lock. It is determined whether the unlock device 1100 is located in the geo-fence region. When the unlock device 1100 is located in the geo-fence region, proceed to the transmitting of the first request message to the server.

After the geo-fence region is determined by a user at the first terminal, operations, e.g. how to determine whether the first terminal is located in the geo-fence region, and what should the first terminal perform when the first terminal is located in the geo-fence region, are processed by the first terminal, and it is unnecessary for the user to perform operations at the first terminal again, thus the method is easy to operate.

In an optional solution, before determining whether the unlock device is located in the geo-fence region, the processor 1101 is further configured to execute the following. A distance between the unlock device 1100 and the geo-fence is determined through positioning, where the distance is used for an owner of the unlock device 1100 to determine within a range of the distance whether a user of the unlock device 1100 is the owner of the unlock device 1100. It is determined whether the user of the unlock device 1100 is the owner of the unlock device. Upon determining that the user of the unlock device 1100 is the owner of the unlock device, proceed to determining whether the unlock device 1100 is located in the geo-fence region.

It can be understood that, the first terminal determines whether the user of the first terminal is the owner of the first terminal, which can avoid security problems that come with the first terminal being used by others.

Figure 12:
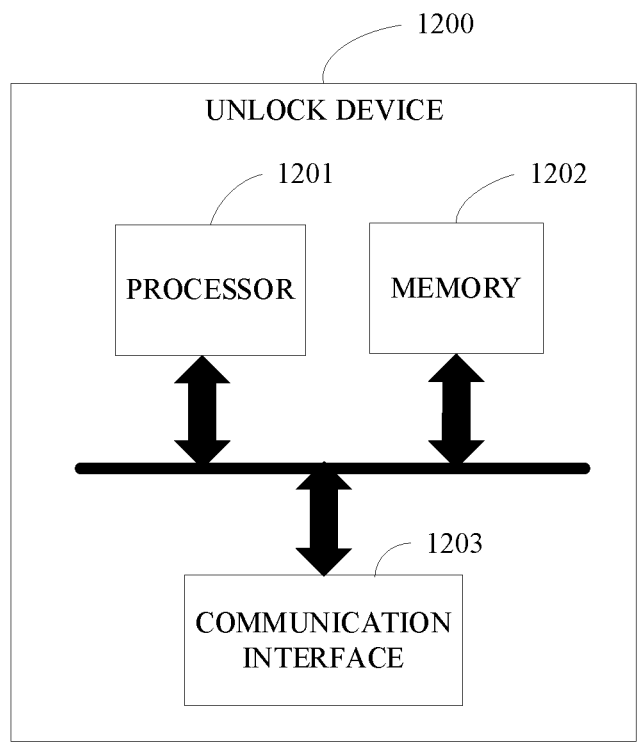
FIG. 12 is a schematic structural diagram illustrating an unlock device provided in other embodiments of the disclosure.

Referring to FIG. 12, FIG. 12 is a schematic structural diagram illustrating an unlock device 1200 provided in other embodiments of the disclosure. The unlock device 1200 may be the above first terminal or a component or a functional module of the first terminal. The unlock device 1200 includes a processor 1201, a memory 1202, and a communication interface 1203, where the processor 1201, the memory 1202, and the communication interface 1203 are coupled with one other via a bus 1204.

The processor 1201 may be one or more CPUs. If the processor 1201 is one CPU, the CPU may be a single-core CPU or a multicore CPU.

The memory 1202 includes, but is not limited to, an RAM, an ROM, an EPROM, or a CD-ROM. The memory 1202 is configured to store related instructions and data. The communication interface 1203 is configured to receive and transmit data.

The processor 1201 in the unlock device 1200 is configured to read out program instructions stored in the memory 1202 to execute the following. A second request message is transmitted to a first smart lock through the communication interface 1203, where the second request message is used to request the first smart lock to transmit to the unlock device 1200 a first key matched with the first terminal. The first key transmitted by the first smart lock is received through the communication interface 1203. An unlock command is transmitted to the first smart lock through the key when the first key is the same as a local second key of the unlock device 1200, where the unlock command is used for the unlock device 1200 to control unlocking of the first smart lock.

In the above method, in a process that the first terminal controls unlocking of the first smart lock through the key, the key has high security, thereby greatly guaranteeing safe unlocking of the first smart lock controlled through the key.

In an optional solution, before transmitting the second request message to the first smart lock, the processor 1201 is further configured to execute the following. A geo-fence region is determined according to a position of the first smart lock bound to the unlock device. It is determined whether the unlock device is located in the geo-fence region. The first smart lock is connected when the unlock device is located in the geo-fence region.

Figure 13:
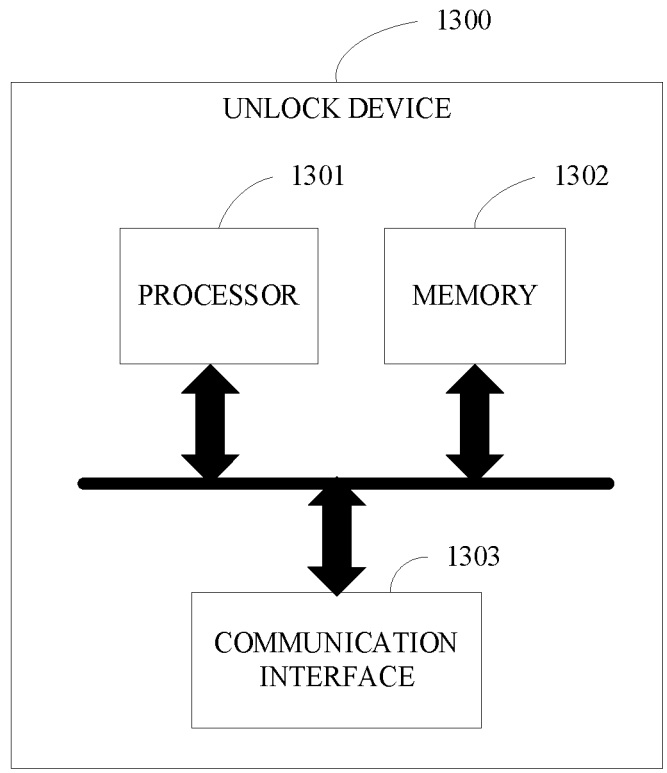
FIG. 13 is a schematic structural diagram illustrating an unlock device provided in other embodiments of the disclosure.

Referring to FIG. 13, FIG. 13 is a schematic structural diagram illustrating an unlock device 1300 provided in other embodiments of the disclosure. The unlock device 1300 may be the above first smart lock or a component or a functional module of the first smart lock. The unlock device 1300 includes a processor 1301, a memory 1302, and a communication interface 1303, where the processor 1301, the memory 1302, and the communication interface 1303 are coupled with one other via a bus 1304.

The processor 1301 may be one or more CPUs. If the processor 1301 is one CPU, the CPU may be a single-core CPU or a multicore CPU.

The memory 1302 includes, but is not limited to, an RAM, an ROM, an EPROM, or a CD-ROM. The memory 1302 is configured to store related instructions and data. The communication interface 1303 is configured to receive and transmit data.

The processor 1301 in the unlock device 1300 is configured to read out program instructions stored in the memory 1302 to execute the following. A second request message transmitted by a first terminal is received through the communication interface 1303. An ID of the unlock device 1300 is determined according to the second request message. A first key matched with the first terminal is transmitted to the first terminal through the communication interface 1303. An unlock command transmitted by the first terminal is received through the communication interface 1303, where the unlock command is transmitted by the first terminal to the unlock device 1300 when verification of a local second key of the first terminal and the first key passes. The unlock command is responded to unlock upon detection of a knocking operation at a door.

In a process of data interaction between the first terminal and the first smart lock, unlocking of the first smart lock can be implemented by performing the knocking operation at the door by a user when the user walks to the first smart lock, thereby greatly reducing information subjectively entered by the user and improving an accuracy rate of unlocking in the process. Moreover, the first terminal can perform data interaction with the first smart lock, thereby realizing unlocking of the first smart lock without the server.

A non-transitory computer-readable storage medium is further provided in embodiments of the disclosure. The non-transitory computer-readable storage medium is configured to store computer instructions which, when executed on a processor, are operable with the processor to implement the method procedures as illustrated in FIG. 2 or FIG. 3.

It is to be noted that for the sake of simplicity, the foregoing method embodiments are described as a series of action combinations. However, it will be appreciated by those skilled in the art that the disclosure is not limited by the sequence of actions described. According to the disclosure, some operations may be performed in other orders or simultaneously. Besides, it will be appreciated by those skilled in the art that the embodiments described in the specification are optional embodiments, and the actions and modules involved are not necessarily essential to the disclosure.

In the foregoing embodiments, the illustration of each embodiment has its own emphasis. For the parts not described in detail in one embodiment, reference may be made to related illustrations in other embodiments.

In several embodiments provided in the disclosure, it will be appreciated that the apparatus disclosed may also be implemented in various other manners. For example, the above apparatus embodiments are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of embodiments.

In addition, various functional units described in various embodiments of the disclosure may be integrated into one processing unit or may be presented as a number of physically separated units, and two or more units may be integrated into one unit. The integrated unit may be implemented by a form of hardware or a software program module.

If the integrated units are implemented as software program modules and sold or used as standalone products, they may be stored in a computer readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computing device (e.g., a personal computer, a server, a network device, etc.) to execute all or part of operations of the method described in various embodiments of the disclosure. The above memory may include various kinds of media that can store program codes, such as a universal serial bus (USB) flash disk, an ROM, an RAM, a mobile hard disc, a magnetic disk, or an optical disk.

It will be understood by those of ordinary skill in the art that all or part of the operations of the various method in the embodiments described above may be accomplished by means of a program to instruct associated hardware, and the program may be stored in a computer-readable memory, which may include a flash disk, an ROM, an RAM, a magnetic disk, or an optical disk.

The above embodiments in the disclosure are introduced in detail. Principles and embodiment manners of the disclosure are elaborated with specific embodiments herein. The illustration of embodiments above is only used to help understanding of method and core ideas of the disclosure. At the same time, for those of ordinary skill in the art, according to ideas of the disclosure, there will be changes in the specific embodiment manners and application scope. In summary, contents of this specification should not be understood as limitation on the disclosure.

What is claimed is:

1. A method for smart lock unlocking, performed by a server, comprising:
   receiving a first request message transmitted by a first terminal;
   determining an identity (ID) of the first terminal according to the first request message;
   determining a first smart lock bound to the first terminal according to the ID of the first terminal and a correspondence between a plurality of terminals and a plurality of smart locks, the correspondence being stored in the server; and
   transmitting a first verification parameter to the first terminal and the first smart lock, the first verification parameter being used for the first terminal to verify an ID of the first smart lock and for the first smart lock to verify the ID of the first terminal when unlocking; wherein
   after transmitting the first verification parameter to the first terminal and the first smart lock, the method further comprises:
      receiving an unlock command transmitted by the first terminal, wherein the unlock command is transmitted when a verification parameter transmitted by the first smart lock to the first terminal is the first verification parameter; and
      transmitting the unlock command to the first smart lock;
   after receiving the unlock command transmitted by the first terminal, the method further comprises:
      determining a time period from a time point when the server transmits the first verification parameter to a time point when the server receives the unlock command; and
   transmitting the unlock command to the first smart lock comprises:
      transmitting the unlock command to the first smart lock when the time period is less than a preset time period.

2. A method for smart lock unlocking, performed by a first terminal, comprising:
   transmitting a first request message to a server, the first request message being used to request the server to transmit a first verification parameter to the first terminal and a first smart lock bound to the first terminal;
   receiving the first verification parameter transmitted by the server;
   receiving a verification parameter transmitted by the first smart lock; and
   transmitting an unlock command to the server when the verification parameter is the same as the first verification parameter, the unlock command being used for the server to control unlocking of the first smart lock; wherein
   before transmitting the first request message to the server, the method further comprises:
      determining a geo-fence region according to a position of the first smart lock bound to the first terminal; and determining whether the first terminal is located in the geo-fence region; and transmitting the first request message to the server comprises:

transmitting the first request message to the server when the first terminal is located in the geo-fence region.

3. The method of claim 2, wherein determining the geo-fence region according to the position of the first smart lock bound to the first terminal comprises:

determining the geo-fence region by determining a geo-fence with the position of the first smart lock as a center and a preset radius; or determining the geo-fence region by outlining an actual geographical region where the first smart lock is located.

4. The method of claim 2, wherein determining whether the first terminal is located in the geo-fence region comprises:

determining a position of the first terminal through positioning;

drawing on an application of the first terminal a line from the position of the first terminal to the position of the first smart lock through an algorithm; and determining that the first terminal is located in the geo-fence region when the line drawn does not intersect with a geo-fence, wherein the geo-fence region is enclosed by the geo-fence.

5. The method of claim 4, further comprising:

determining that the first terminal is not located in the geo-fence region when the line drawn intersects with the geo-fence.

6. The method of claim 2, wherein determining whether the first terminal is located in the geo-fence region comprises:

monitoring periodically a change of a position of the first terminal, to determine a distance between the first terminal and a geo-fence, wherein the geo-fence region is enclosed by the geo-fence; and determining that the first terminal is located in the geo-fence region when the distance is less than a distance threshold.

7. The method of claim 2, wherein before receiving the verification parameter transmitted by the first smart lock, the method further comprises:

starting to monitor broadcast data once the first terminal receives a reply that the first smart lock successfully broadcasts, wherein the verification parameter transmitted by the first smart lock is carried in broadcast data.

8. The method of claim 7, further comprising:

stopping monitoring of broadcast data when the verification parameter is different from the first verification parameter.

9. An unlock device, comprising:
a processor; and
a memory, coupled with the processor and storing program instructions which are operable with the processor to execute the method of claim 1.

10. An unlock device, comprising:
a processor; and
a memory, coupled with the processor and storing program instructions which are operable with the processor to execute the method of claim 2.

11. A non-transitory computer-readable storage medium storing computer programs which, when executed by a processor, are operable with the processor to execute the method of claim 1.

12. A non-transitory computer-readable storage medium storing computer programs which, when executed by a processor, are operable with the processor to execute the method of claim 2.

13. A method for smart lock unlocking, performed by a first smart lock, comprising:

receiving a first verification parameter transmitted by a server, the first verification parameter being a verification parameter that is transmitted by the server to a first terminal and the first smart lock when the server receives a first request message transmitted by the first terminal;

broadcasting the first verification parameter, the first verification parameter broadcasted being used for the first terminal to verify an identity (ID) of the first smart lock;

receiving an unlock command transmitted by the server, the unlock command being transmitted by the first terminal to the server when verification of the ID of the first smart lock passes; and responding to the unlock command to unlock upon detection of a knocking operation at a door.

14. The method of claim 13, wherein before responding to the unlock command to unlock upon detection of the knocking operation at the door, the method further comprises:

detecting, by an angular motion detection apparatus of the first smart lock, an angular acceleration of the angular motion detection apparatus; and determining that the knocking operation at the door is detected when the angular acceleration reaches a preset angular acceleration.

15. An unlock device, comprising:
a processor; and
a memory, coupled with the processor and storing program instructions which are operable with the processor to execute the method of claim 13.

16. A non-transitory computer-readable storage medium storing computer programs which, when executed by a processor, are operable with the processor to execute the method of claim 13.

* * * * *